US012656571B2

(12) United States Patent
Lee et al.

(10) Patent No.: US 12,656,571 B2
(45) Date of Patent: Jun. 16, 2026

(54) ELECTRONIC DEVICE INCLUDING STRUCTURE FOR ADJUSTING DISTANCE BETWEEN LENSES

(71) Applicant: SAMSUNG ELECTRONICS CO., LTD., Suwon-si (KR)

(72) Inventors: Seunghoon Lee, Suwon-si (KR); Gyeongtae Kim, Suwon-si (KR); Heecheul Moon, Suwon-si (KR); Sangyoup Seok, Suwon-si (KR); Heebo Shim, Suwon-si (KR); Dongoh Lee, Suwon-si (KR); Changmin Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 274 days.

(21) Appl. No.: 18/618,538

(22) Filed: Mar. 27, 2024

(65) Prior Publication Data
US 2024/0427110 A1     Dec. 26, 2024

Related U.S. Application Data

(63) Continuation of application No. PCT/KR2024/002901, filed on Mar. 6, 2024.

(30) Foreign Application Priority Data

Jun. 20, 2023     (KR) ........................ 10-2023-0078935
Jul. 18, 2023     (KR) ........................ 10-2023-0093397

(51) Int. Cl.
G02B 7/00     (2021.01)
G02B 7/02     (2021.01)
G06F 1/16     (2006.01)

(52) U.S. Cl.
CPC ............. G02B 7/023 (2013.01); G06F 1/163 (2013.01)

(58) Field of Classification Search
CPC ....... G02B 7/023; G06F 1/163; G11B 7/0932; G11B 7/0935; G11B 7/0933; G11B 7/22
(Continued)

(56) References Cited

U.S. PATENT DOCUMENTS 10,386,647 B1     8/2019   Yu et al.
10,794,879 B2    10/2020   Verenchikov
(Continued)

FOREIGN PATENT DOCUMENTS

CN     107015363 A     8/2017
CN     110579878 A  * 12/2019 ......... G02B 27/0176
(Continued)

OTHER PUBLICATIONS

International Search Report and Written Opinion (PCT/ISA/210 and PCT/ISA/237) dated Jun. 19, 2024, issued by International Searching Authority for International Application No. PCT/KR2024/002901.

*Primary Examiner* — Henry Duong
(74) *Attorney, Agent, or Firm* — Sughrue Mion, PLLC

(57)     ABSTRACT

An electronic device includes: a first lens support coupled to a first lens; a second lens support configured to move with respect to the first lens support, the second lens support being coupled to a second lens; a first adjusting structure configured to adjust a distance between the first lens and the second lens, the first adjusting structure including a first protruding part and a second protruding part disposed on the first protruding part; and a second adjusting structure including: a plurality of grooves spaced apart from each other and arranged with respect to the first protruding part and the
(Continued)

second protruding part, and a plurality of protrusions disposed between the plurality of grooves.

20 Claims, 28 Drawing Sheets

(58) Field of Classification Search
USPC .......................................................... 359/813
See application file for complete search history.

(56) References Cited

U.S. PATENT DOCUMENTS

| | | |
|---|---|---|
| 11,425,829 B2 | 8/2022 | Zheng et al. |
| 2021/0149151 A1 | 5/2021 | Tseng et al. |
| 2022/0082843 A1 | 3/2022 | Magyari |
| 2022/0382063 A1 | 12/2022 | Xia |

FOREIGN PATENT DOCUMENTS

| | | | |
|---|---|---|---|
| KR | 20-0483039 Y1 | 3/2017 | |
| KR | 10-2241327 B1 | 4/2021 | |
| KR | 10-2022-0166145 A | 12/2022 | |

* cited by examiner

ELECTRONIC DEVICE INCLUDING STRUCTURE FOR ADJUSTING DISTANCE BETWEEN LENSES

CROSS-REFERENCE TO RELATED APPLICATIONS

This application is a by-pass continuation application of International Application No. PCT/KR2024/002901, filed on Mar. 6, 2024, which is based on and claims priority to Korean Patent Application Nos. 10-2023-0078935, filed on Jun. 20, 2023 (8DD4), and 10-2023-0093397, filed on Jul. 18, 2023 (C5A3), in the Korean Intellectual Property Office, the disclosures of which are incorporated by reference herein their entireties.

BACKGROUND

1. Field

The disclosure relates to an electronic device including a structure for adjusting a distance between lenses.

2. Description of Related Art

As user's demands for electronic devices become varied, forms of the electronic device become also diverse. For example, the electronic device may be a wearable device configured to provide various visual information to the user when the user wears the wearable device. The wearable device may include a structure capable of adjusting a relative position between components to correspond to the user's body.

SUMMARY

An electronic device is provided. According to an aspect of the disclosure, an electronic device includes: a first lens support coupled to a first lens; a second lens support configured to move with respect to the first lens support, the second lens support being coupled to a second lens; a first adjusting structure configured to adjust a distance between the first lens and the second lens, the first adjusting structure including a first protruding part and a second protruding part disposed on the first protruding part; and a second adjusting structure including: a plurality of grooves spaced apart from each other and arranged with respect to the first protruding part and the second protruding part, and a plurality of protrusions disposed between the plurality of grooves, wherein, when the distance between the first lens and the second lens is a first distance, the first protruding part is configured to maintain the first distance by engaging with the plurality of protrusions, and the second protruding part is positioned outside of the plurality of grooves, and wherein, when the distance between the first lens and the second lens is a second distance different from the first distance, the first protruding part is positioned outside of the plurality of grooves, and the second protruding part is configured to maintain the second distance by engaging with the plurality of protrusions.

A wearable device is provided. According to an aspect of the disclosure, a wearable device includes: a first lens support coupled to a first lens; a second lens support configured to move with respect to the first lens support, the second lens support being coupled to a second lens; a first adjusting structure coupled to the first lens support, the first adjusting structure including: a first flange part, a first protruding part protruding from the first flange part, and an opening surrounded by the first flange part by penetrating the first flange part, and a second adjusting structure configured to guide a movement of the first lens support with respect to the second lens support, the second adjusting structure including: a plurality of grooves arranged to be spaced apart from each other, and a plurality of protrusions disposed between the plurality of grooves, wherein, when a distance between the first lens and the second lens is a first distance, the first protruding part is positioned inside of a groove of the plurality of grooves, and wherein, when the distance is a second distance different from the first distance, the first protruding part is positioned outside of the plurality of grooves, as a shape of the opening is changed by a contact between the first protruding part and a protrusion of the plurality of protrusions.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
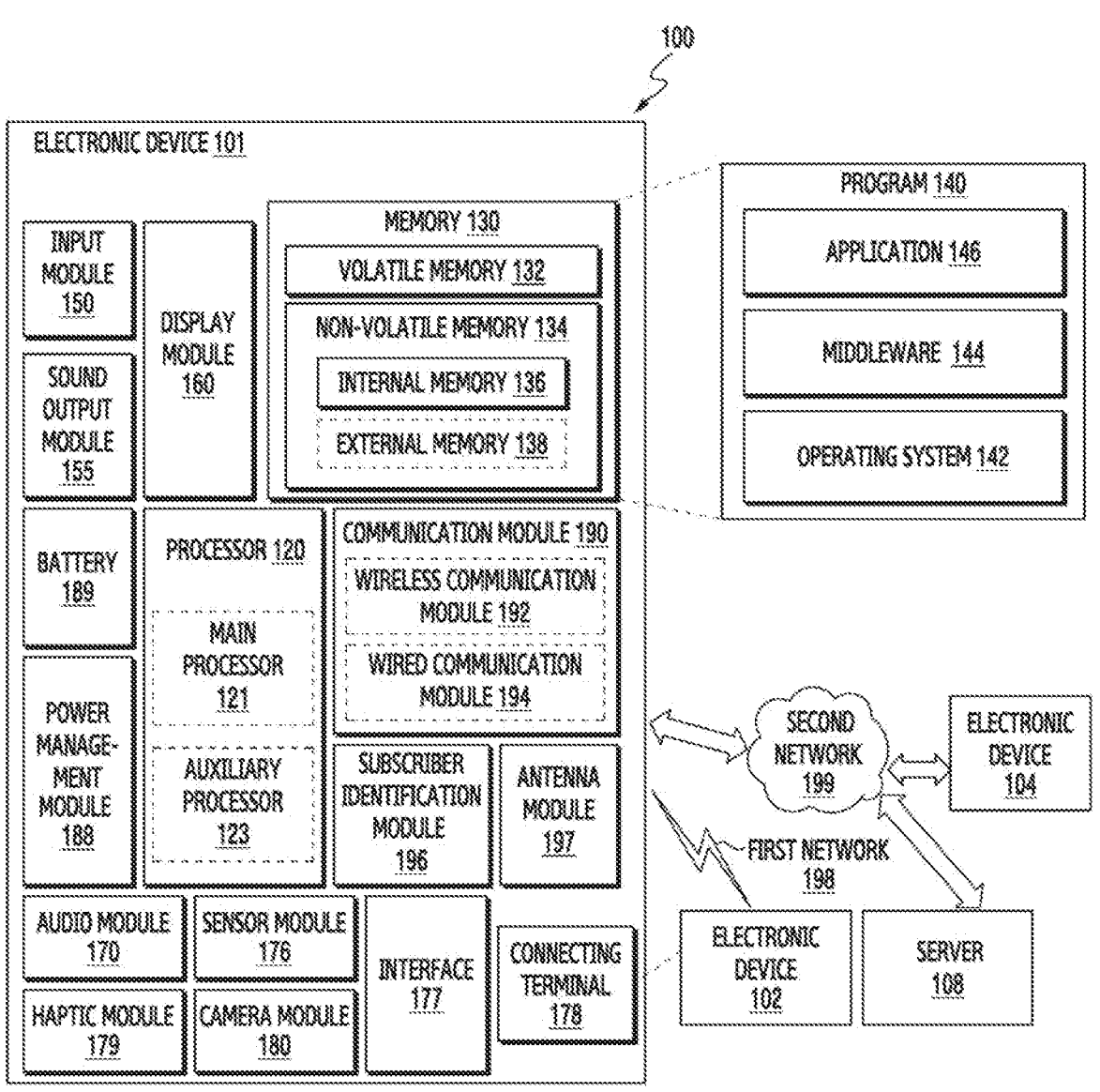
FIG. 1 is a block diagram of an electronic device in a network environment according to an embodiment.

FIG. 1 is a block diagram illustrating an electronic device 101 in a network environment 100 according to an embodiment.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Non-limiting examples of learning algorithms may be supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to an embodiments, the antenna module 197 may form an mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra-low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
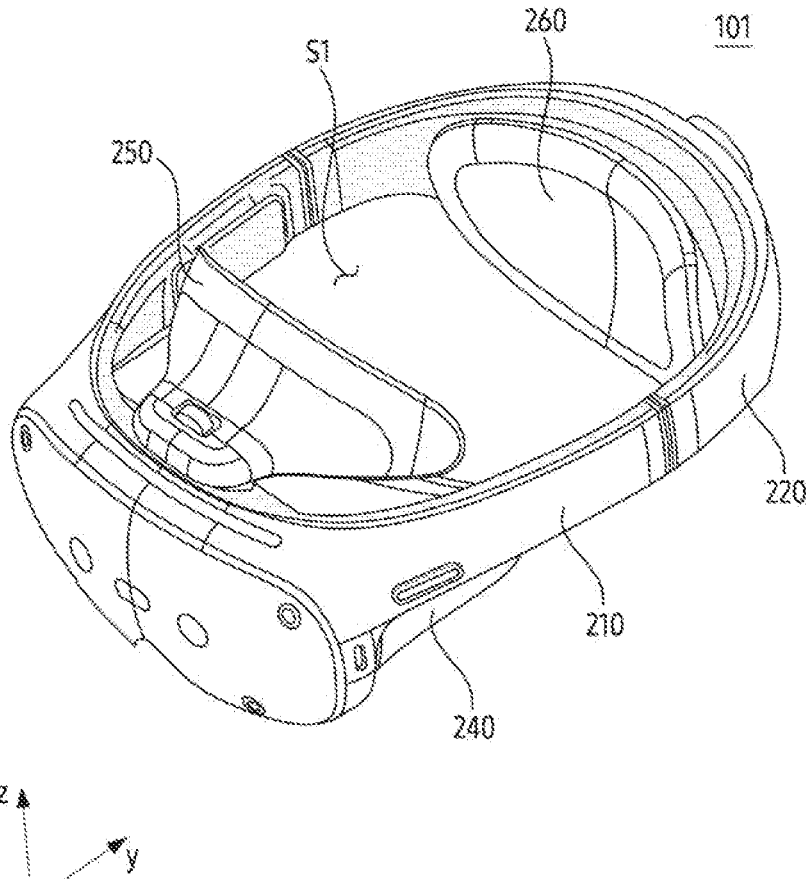
FIG. 2A is a perspective view of an example electronic device according to an embodiment.
Figure 2B:
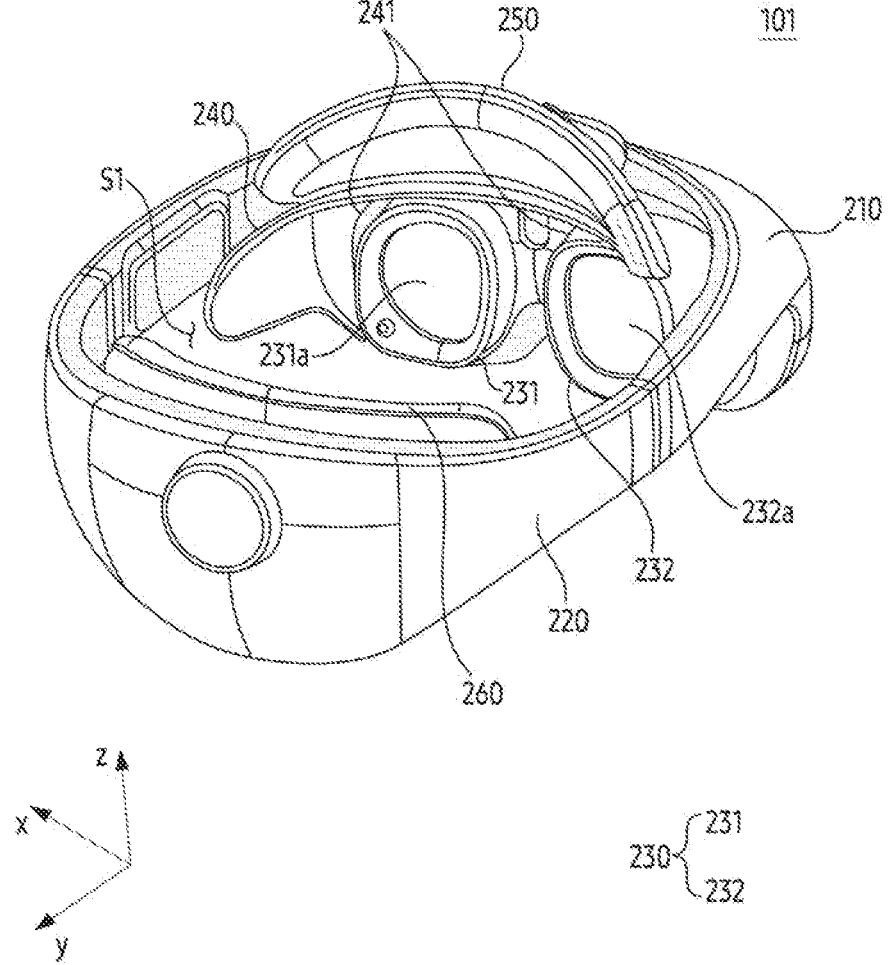
FIG. 2B is a perspective view of an example electronic device according to an embodiment.
Figure 2C:
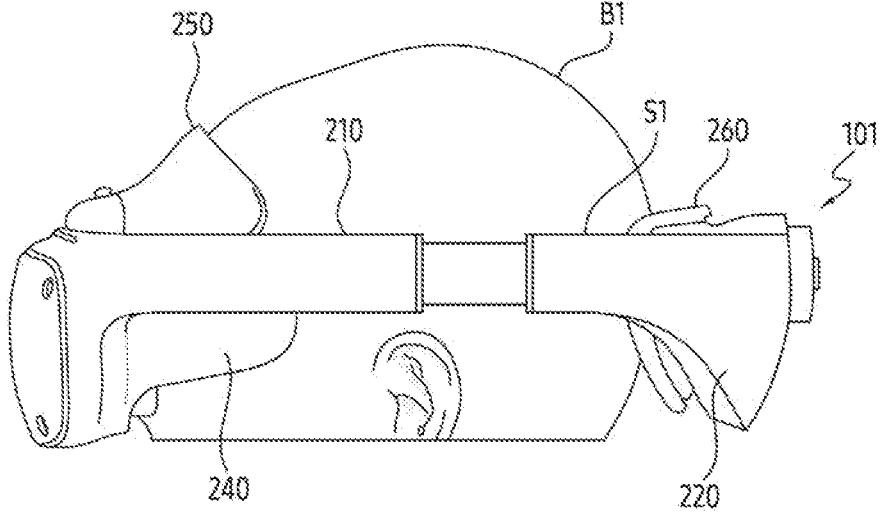
FIG. 2C illustrates a state in which an example electronic device according to an embodiment is worn by a user.
Figure 2C:
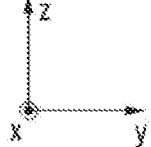

FIG. 2A is a perspective view of an example electronic device according to an embodiment. FIG. 2B is a perspective view of an example electronic device according to an embodiment. FIG. 2C illustrates a state in which an example electronic device according to an embodiment is worn by a user.

Referring to FIGS. 2A, 2B, and 2C, according to an embodiment, an electronic device 101 may include a first housing 210, a second housing 220, a plurality of lens supports 230, a cover 240, a first pad 250, and/or a second pad 260. According to an embodiment, the electronic device 101 may be referred to as a wearable device worn on a part B1 of a user's body. For example, the electronic device 101 may be worn on the user's head.

According to an embodiment, the electronic device 101 may be configured to provide a user with augmented reality (AR), virtual reality (VR), or mixed reality (MR) combining the augmented reality and the virtual reality. For example, the electronic device 101 may be configured to provide virtual reality (or virtual space) to the user, based on receiving data about an image from outside of the electronic device 101. Virtual reality may be represented based on two dimensions and/or three dimensions. For example, an image provided by the electronic device 101 may include a still image and/or video for realizing virtual reality. For example, the electronic device 101 may be configured to provide augmented reality to the user, by superimposing a virtual object on a real image representing an external environment of the electronic device 101. The real image may correspond to the external environment. The virtual object may include at least one of text and image corresponding to various information related to an object included in the real image. However, the virtual object is not limited thereto, and the virtual object may include at least one of text and image corresponding to various information related to another object distinguished from the object included in the real image. For example, the electronic device 101 may be referred to as at least one of a virtual reality (VR) device and a mixed reality (MR) device. For example, since the electronic device 101 may be used when being worn on the user's head, it may be referred to as a head mounted display device (HMD device).

According to an embodiment, the first housing 210 may form (or define) a part of an outer surface of the electronic device 101. The first housing 210 may form (or define) a part of a space in which various components of the electronic device 101 may be disposed. The first housing 210 may support various components of the electronic device 101. For example, the plurality of lens supports 230, the cover 240, and/or the first pad 250 may be coupled to the first housing 210. The first housing 210 may surround (or cover) the part B1 of the user's body when the electronic device 101 is worn by the user. For example, the first housing 210 may at least partially accommodate the part B1 of the user's body when the electronic device 101 is worn by the user. For example, the first housing 210 may be in contact with the part B1 of the user's body when the electronic device 101 is worn by the user, but the first housing 210 is not limited thereto. For example, the first housing 210 may be referred to as a main housing. For example, since the first housing 210 provides the overall framework of the electronic device 101, it may be referred to as a frame.

According to an embodiment, the second housing 220 may form (or define) another part of the outer surface of the electronic device 101. The second housing 220 may form (or define) another part of a space in which various components of the electronic device 101 may be disposed. The second housing 220 may support various components of the electronic device 101. For example, the second housing 220 may support the second pad 260. The second pad 260 may be disposed on the second housing 220. The second housing 220 may surround (or cover) the part B1 of the user's body when the electronic device 101 is worn by the user. For example, the second housing 220 may at least partially accommodate the part B1 of the user's body when the electronic device 101 is worn by the user. For example, the second housing 220 may be in contact with the part B1 of the user's body when the electronic device 101 is worn by the user, but the second housing 220 is not limited thereto. The second housing 220 may be movable with respect to the first housing 210. For example, the second housing 220 may be movable with respect to the first housing 210 so that the part B1 of the user's body is accommodated in a space s1 between the first housing 210 and the second housing 220. For example, the second housing 220 may be movable with respect to the first housing 210 so that it is close to the first housing 210 or away from the first housing 210. As the second housing 220 is movable with respect to the first housing 210, a size of the space s1 between the first housing 210 and the second housing 220 may be adjusted (or changed) to correspond to a size of the part B1 of the user's body. The second housing 220 may be referred to as a sub-housing. The second housing 220 may be referred to as a band housing.

According to an embodiment, each of the plurality of lens supports 230 may correspond to the user's eyes of the electronic device 101. Each of the plurality of lens supports 230 may face the user's eyes when the electronic device 101 is worn by the user. Each of the plurality of lens supports 230 may be coupled to the first housing 210. For example, a part of each of the plurality of lens supports 230 may be disposed (or accommodated) inside the first housing 210. For example, another part of each of the plurality of lens supports 230 may protrude outside the first housing 210. The plurality of lens supports 230 may include a first lens support 231 and a second lens support 232.

According to an embodiment, the first lens support 231 may be movable with respect to the first housing 210 to face the user's eyes. For example, the first lens support 231 may be movable with respect to the first housing 210 to be close to or away from the second lens support 232. The first lens support 231 may be coupled to a first lens 231*a*. The first lens 231*a* may refract (or distort) light emitted from at least one display of the electronic device 101 so that the electronic device 101 may provide virtual reality. The first lens 231*a* may be exposed to the outside of the first housing 210. The first lens 231*a* may be disposed outside the first housing 210.

According to an embodiment, the second lens support 232 may be movable with respect to the first housing 210 to face the user's eyes. For example, the second lens support 232 may be movable with respect to the first housing 210 to be close or away from the first lens support 231. As the first lens support 231 and the second lens support 232 are movable with respect to each other, a distance between the first lens 231*a* and a second lens 232*a* may be adjusted to correspond to an 'inter pupillary distance' (in short, gIPD) of the user. The second lens support 232 may be coupled to the second lens 232*a*. The second lens 232*a* may refract (or distort) light emitted from at least one display of the electronic device 101 so that the electronic device 101 may provide virtual reality. The second lens 232*a* may be exposed to the outside of the first housing 210. The second lens 232*a* may be disposed outside the first housing 210.

According to an embodiment, the cover 240 may reduce (or suppress) dispersing light passing through the first lens 231*a* and the second lens 232*a* to the outside of the cover 240, in a state that the electronic device 101 is worn by the user. As the cover 240 reduces a transfer of light passing through the first lens 231*a* and the second lens 232*a* to the outside of the cover 240, the electronic device 101 may provide, to the user, an environment of immersed virtual reality. The cover 240 may cover (or surround) the part B1 of the user's body when the electronic device 101 is worn by the user. For example, the cover 240 may be in contact with the part B1 of the user's body when the electronic device 101 is worn by the user. The cover 240 may be disposed on the first housing 210. For example, the cover 240 may be disposed on a surface of the first housing 210 facing the part B1 of the user's body when the electronic device 101 is worn by the user. The cover 240 may be penetrated by the first lens support 231 and the second lens support 232. For example, the cover 240 may include a plurality of holes 241 accommodating each of the first lens support 231 and the second lens support 232. For example, since the cover 240 covers the user's face when the electronic device 101 is worn by the user, it may be referred to as a face cover.

According to an embodiment, the first pad 250 may support the electronic device 101 when the electronic device 101 is worn by the user. The first pad 250 may maintain a position of the electronic device 101 with respect to the part B1 of the user's body when the electronic device 101 is worn by the user. The first pad 250 may be in contact with the user's forehead when the electronic device 101 is worn by the user. The first pad 250 may be coupled to the first housing 210. The first pad 250 may be disposed on the first housing 210. According to an embodiment, the first pad 250 may be movable with respect to the first housing 210. For example, the first pad 250 can be rotated (or be tilted) with respect to the first housing 210. As the first pad 250 is movable with respect to the first housing 210, a posture (or angle) of the first pad 250 with respect to the first housing 210 may be adjusted (or changed). As the posture of the first pad 250 with respect to the first housing 210 is changed, the first pad 250 may be stably in contact with the user's forehead. For example, since the first pad 250 supports the user's forehead when the electronic device 101 is worn by the user, it may be referred to as a front pad (or front cushion).

According to an embodiment, the second pad 260 may support the electronic device 101 when the electronic device 101 is worn by the user. The second pad 260 may maintain the position of the electronic device 101 with respect to the part B1 of the user's body when the electronic device 101 is worn by the user. For example, the second pad 260 may be in contact with the user's back of head when the electronic device 101 is worn by the user. The second pad 260 may be coupled to the second housing 220. The second pad 260 may be disposed on the second housing 220. The second pad 260 may be disposed on a surface of the second housing 220 facing the part B1 of the user's body when the electronic device 101 is worn on the user. According to an embodiment, the second pad 260 may be movable with respect to the second housing 220. The second pad 260 can be rotated (or be tilted) with respect to the second housing 220. As the second pad 260 is movable with respect to the second housing 220, a posture (or angle) of the second pad 260 with respect to the second housing 220 may be adjusted (or changed). As the posture of the second pad 260 with respect to the second housing 220 is changed, the second pad 260 may be stably in contact with the user's back of head. For example, since the second pad 260 supports the user's back of head when the electronic device 101 is worn by the user, it may be referred to as a back pad (or back cushion).

Figure 3:
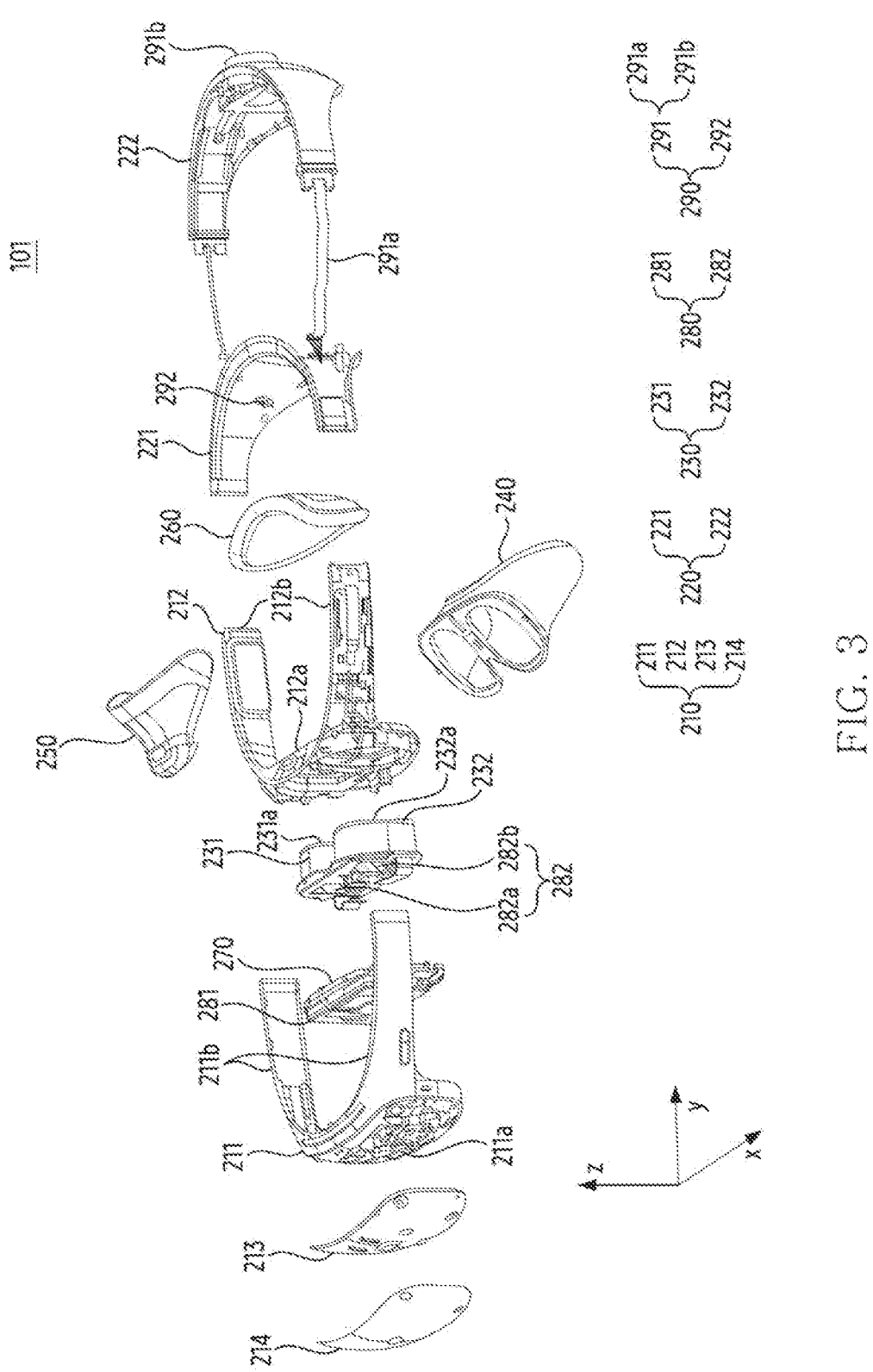
FIG. 3 is an exploded perspective view of an example electronic device according to an embodiment.

FIG. 3 is an exploded perspective view of an example electronic device according to an embodiment.

Referring to FIG. 3, according to an embodiment, the electronic device 101 may further include a bracket 270, an electronic component 280, and a plurality of adjustment modules 290.

According to an embodiment, the bracket 270 may support components disposed within the first housing 210. For example, the bracket 270 may support a printed circuit board 281. The bracket 270 may be disposed within the first housing 210. The bracket 270 may be surrounded by the first housing 210.

According to an embodiment, the electronic component 280 may implement various functions of the electronic device 101. For example, the electronic component 280 may include the printed circuit board 281 and at least one display 282. However, the electronic component 280 is not limited thereto. For example, the electronic component 280 may include various electronic components in addition to the above-described examples.

According to an embodiment, the printed circuit board 281 may form (or establish) an electrical connection between electronic components in the electronic device 101. The printed circuit board 281 may support at least one of electronic components in the electronic device 101. For example, the printed circuit board 281 may support a processor of the electronic device 101 (e.g., the processor 120 of FIG. 1). The processor 120 may be disposed on the printed circuit board 281. The printed circuit board 281 may be disposed within the first housing 210. The printed circuit board 281 may be disposed on the bracket 270. The printed circuit board 281 may be disposed on a surface of the bracket 270.

According to an embodiment, the display 282 may be configured to provide visual content. The at least one display 282 may be disposed within the first housing 210. For example, the display 282 may face another surface of the bracket 270 opposite to the surface of the bracket 270 on which the printed circuit board 281 is disposed. According to an embodiment, the display 282 may be movable with respect to the first housing 210. For example, the display 282 may include a first display 282a coupled to the first lens support 231 and a second display 282b coupled to the second lens support 232. The first display 282a may be disposed on the first lens support 231. The first display 282a may emit light toward the first lens 231a. The light emitted from the first display 282a may be transmitted to the user by passing through the first lens 231a. The second display 282b may be disposed on the second lens support 232. The second display 282b may emit light toward the second lens 232a. The light emitted from the second display 282b may be transmitted to the user by passing through the second lens 232a. However, the second display 282b is not limited thereto. For example, the display 282 may include only one display fixed on the other surface of bracket 270.

According to an embodiment, the plurality of adjustment modules 290 may include a first adjustment module 291 and a second adjustment module 292.

According to an embodiment, the first adjustment module 291 may couple the second housing 220 and the first housing 210 so that the second housing 220 is movable with respect to the first housing 210. A distance between the second housing 220 and the first housing 210 may be adjusted (or changed) by the first adjustment module 291. The first adjustment module 291 may include a band 291a and a first knob 291b. The band 291a may be disposed within the first housing 210 and the second housing 220. The band 291a may extend from the second housing 220 to the first housing 210. The band 291a may be operated through the first knob 291b exposed to the outside of the second housing 220. By a movement of the second housing 220 with respect to the first housing 210, at least a part of the band 291a may be exposed to the outside of the electronic device 101, or may be covered by the first housing 210 and the second housing 220. For example, as the user adjusts the distance between the first housing 210 and the second housing 220 to increase through the knob 291b, the part of the band 291a may be exposed to the outside of the electronic device 101. For example, as the user adjusts the distance between the first housing 210 and the second housing 220 to reduce through the knob 291b, the part of the band 291a may be covered by the first housing 210 and the second housing 220.

According to an embodiment, the second adjustment module 292 may couple the second pad 260 to the second housing 220 so that the second pad 260 is movable with respect to the second housing 220. For example, at least a part of the second adjustment module 292 may be exposed to the outside of the second housing 220.

According to an embodiment, the first housing 210 may include a first case 211, a second case 212, a front panel 213, and/or a visor 214. The first case 211, the second case 212, the front panel 213, and the visor 214 may be coupled to each other. The first case 211, the second case 212, the front panel 213, and the visor 214 may be coupled to each other to form (or define) the first housing 210.

According to an embodiment, the first case 211 may include a first support part 211a and/or at least one first band part 211b.

According to an embodiment, the first support part 211a may face the printed circuit board 281. The printed circuit board 281 may be disposed on (or within) the first support part 211a. The printed circuit board 281 may be disposed (or interposed) between the first support part 211*a* and the bracket 270. The first pad 250 may be disposed on the first support part 211*a*.

According to an embodiment, at least one first band part 211*b* may surround (or cover) a part of the user's body (e.g., the user's body part B1 of FIG. 2C), in a state that the electronic device 101 is worn by the user. The at least one first band part 211*b* may have a shape extending from the first support part 211*a*. For example, the first band part 211*b* may extend in a direction away from the first support part 211*a*. For example, the first band part 211*b* may include a plurality of first band parts spaced apart from each other, but the first band part 211*b* is not limited thereto.

According to an embodiment, the second case 212 may include a second support part 212*a* and/or at least one second band part 212*b*.

According to an embodiment, the second support part 212*a* may be coupled to the first support part 211*a*. For example, a shape of the second support part 212*a* may correspond to the shape of the first support part 211*a*. The first support part 211*a* and the second support part 212*a* may be coupled with each other to provide a space in which components of the electronic device 101 may be disposed. For example, a part of each of the bracket 270, the printed circuit board 281, and the plurality of lens supports 230 may be disposed between the first support part 211*a* and the second support part 212*a*. The second support part 212*a* may include a plurality of lens openings through which another part of each of the plurality of lens supports 230 passes. The other part of each of the plurality of lens supports 230 may be exposed to the outside of the first housing 210 by penetrating the plurality of lens openings. The second support part 212*a* may support the cover 240. For example, the cover 240 may be disposed on the second support part 212*a*.

According to an embodiment, at least one second band part 212*b* may be coupled to at least one first band part 211*b*. For example, a shape of at least one second band part 212*b* may correspond to the shape of at least one first band part 211*b*. For example, the second band part 212*b* may include a plurality of second band parts spaced apart from each other, but the second band part 212*b* is not limited thereto. A part of the band 291*a* may be disposed within the first band part 211*b* and at least one second band part 212*b*. The part of the band 291*a* may be surrounded (or surrounded) by the first band part 211*b* and the second band part 212*b*.

According to an embodiment, the front panel 213 may cover at least one of components in the first housing 210 so that the components in the first housing 210 are not visible from the outside. The front panel 213 may be disposed on the first housing 210. For example, the front panel 213 may be disposed on the first support part 211*a* of the first housing 210.

According to an embodiment, the visor 214 may be disposed on the first housing 210. The visor 214 may be disposed on the front panel 213. For example, at least part of the visor 214 may be formed of a material that is substantially transparent or substantially translucent. Thus, a camera (e.g., the camera module 180 of FIG. 1) of the electronic device 101 may receive light from the outside of the electronic device 101, but the camera is not limited thereto.

According to an embodiment, the second housing 220 may include a third case 221 and/or a fourth case 222. The third case 221 and the fourth case 222 may be coupled to each other. The third case 221 and the fourth case 222 may be coupled to each other to form (or define) the second housing 220.

According to an embodiment, the third case 221 may face the second case 212. The third case 221 may support the second pad 260. The second pad 260 may be disposed on the third case 221. A part of the second adjustment module 292 may protrude (or be exposed) to the outside of the third case 221.

According to an embodiment, the fourth case 222 may be coupled to the third case 221. Another part of the band 291*a* may extend within the third case 221 and the fourth case 222. The knob 291*b* may protrude to the outside of the fourth case 222.

For example, in order to provide more realistic virtual reality to the user, a distance between the first lens support 231 and the second lens support 232 may be adjusted (or changed), based on the user's inter pupillary distance.

Figure 4A:
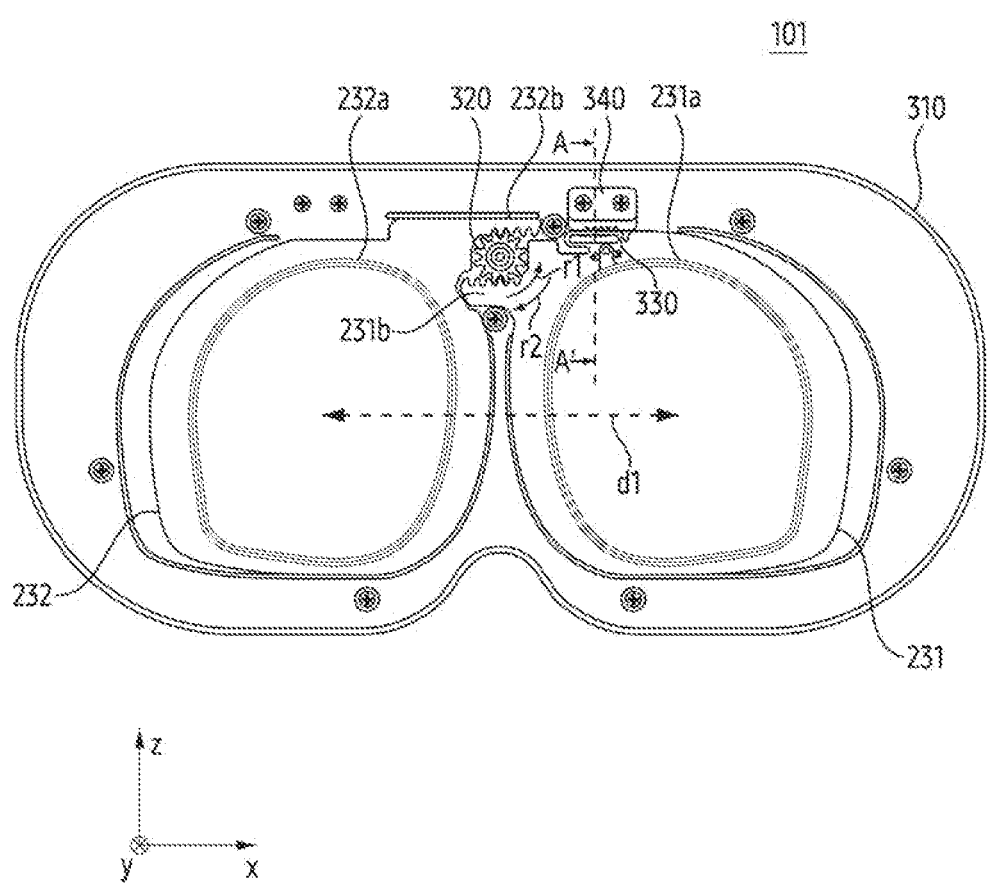
FIG. 4A is a top plan view of an example electronic device according to an embodiment when a distance between a first lens and a second lens is a first distance.
Figure 4B:
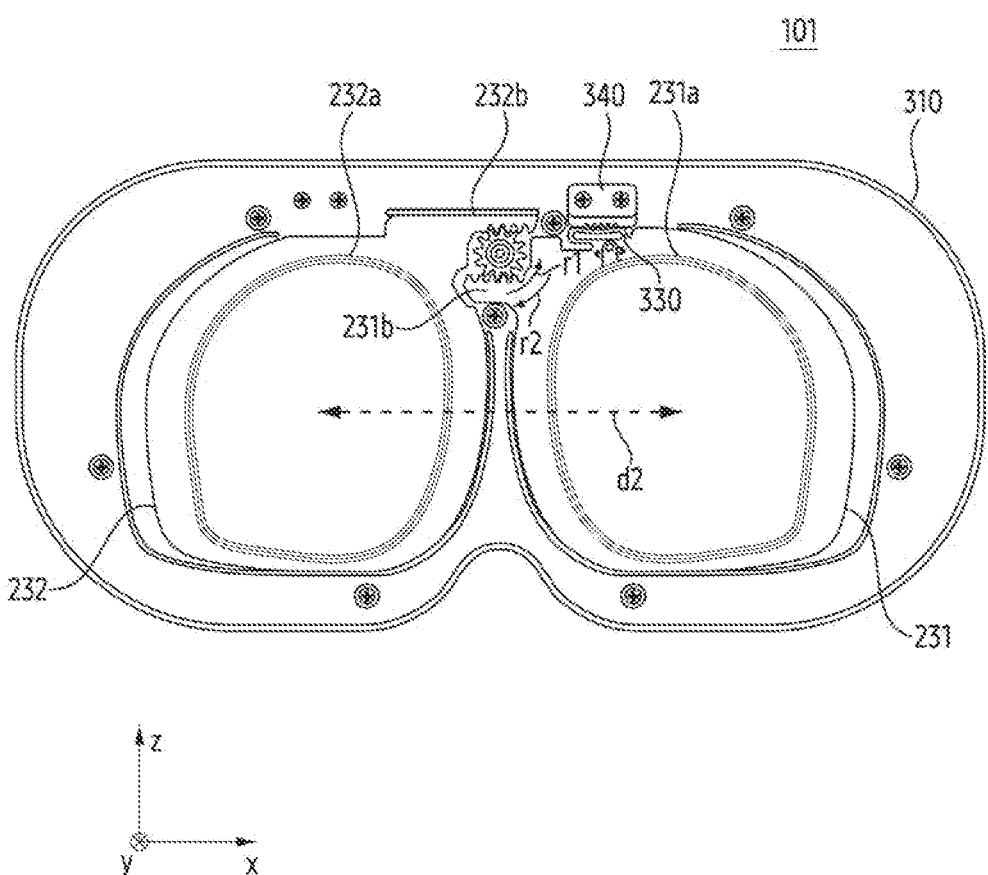
FIG. 4B is a top plan view of an example electronic device according to an embodiment when a distance between a first lens and a second lens is a first distance.

FIG. 4A is a top plan view of an example electronic device according to an embodiment when a distance between a first lens and a second lens is a first distance. FIG. 4B is a top plan view of an example electronic device according to an embodiment when a distance between a first lens and a second lens is a first distance.

Referring to FIGS. 4A and 4B, according to an embodiment, an electronic device 101 may include the first lens support 231, the second lens support 232, a supporting member 310, a pinion gear 320, a first adjusting structure 330, and a second adjusting structure 340.

According to an embodiment, the first lens support 231 may support a first lens 231*a*. The first lens support 231 may be coupled to the first lens 231*a*. The first lens 231*a* may move together with the first lens support 231 when the first lens support 231 moves, by being coupled to the first lens support 231. The first lens 231*a* may be exposed to the outside of the supporting member 310. The first lens 231*a* may be disposed outside the supporting member 310. The first lens support 231 may be movable with respect to the supporting member 310. For example, the first lens support 231 may be movable with respect to the supporting member 310 along a first direction (e.g., +x direction) away from the second lens support 232 or a second direction (e.g., −x direction) approaching the second lens support 232. According to an embodiment, the first lens support 231 may include a first rack gear 231*b*.

According to an embodiment, the first rack gear 231*b* may be coupled to the first lens support 231. For example, the first rack gear 231*b* may be integrally formed with the first lens support 231, but the first rack gear 231*b* is not limited thereto. For example, the first rack gear 231*b* may be formed separately from the first lens support 231, and then, coupled to the first lens support 231. The first rack gear 231*b* may be engaged with the pinion gear 320. For example, the first rack gear 231*b* may include a plurality of gear teeth engaged with the pinion gear 320. The plurality of gear teeth of the first rack gear 231*b* may be arranged to be spaced apart from each other along the first direction (e.g., +x direction) and/or the second direction (e.g., −x direction).

According to an embodiment, the second lens support 232 may support the second lens 232*a*. The second lens support 232 may be coupled to the second lens 232*a*. The second lens 232*a* may move together with the second lens support 232 when the second lens support 232 moves, by being coupled to the second lens support 232. The second lens 232*a* may be exposed to the outside of the supporting member 310. The second lens 232*a* may be disposed outside the supporting member 310. The second lens support 232 may be movable with respect to the supporting member 310. For example, the second lens support 232 may be movable relative to the supporting member 310 along the second direction (e.g., −x direction) away from the first lens support 231 or the first direction (e.g., +x direction) approaching the first lens support 231. According to an embodiment, the second lens support 232 may include a second rack gear 232*b*.

According to an embodiment, the second rack gear 232*b* may be coupled to the second lens support 232. For example, the second rack gear 232*b* may be integrally formed with the second lens support 232, but the second rack gear 232*b* is not limited thereto. For example, the second rack gear 232*b* may be formed separately from the second lens support 232, and then, coupled to the second lens support 232. The second rack gear 232*b* may be engaged with the pinion gear 320. For example, the second rack gear 232*b* may include a plurality of gear teeth engaged with the pinion gear 320. The plurality of gear teeth of the second rack gear 232*b* may be arranged to be spaced apart from each other along the first direction (e.g., +x direction) and/or the second direction (e.g., −x direction). According to an embodiment, the second rack gear 232*b* may face the first rack gear 231*b*. For example, the second rack gear 232*b* may face away from the first rack gear 231*b*. For example, the second rack gear 232*b* may be spaced apart from the first rack gear 231*b* in a direction perpendicular to the first direction (e.g., +x direction).

According to an embodiment, the supporting member 310 may accommodate a part of the first lens support 231, a part of the second lens support 232, the first adjusting structure 330, and/or the second adjusting structure 340. For example, a part of the first lens support 231, a part of the second lens support 232, the first adjusting structure 330, and/or the second adjusting structure 340 may be disposed inside the supporting member 310. For example, the supporting member 310 may be one of a first housing (e.g., the first housing 210 in FIGS. 2A, 2B, and 2C), and a bracket (e.g., the bracket 270 in FIG. 3), but the supporting member 310 is not limited thereto.

According to an embodiment, the pinion gear 320 may be engaged with the first rack gear 231*b* and the second rack gear 232*b*. For example, the pinion gear 320 may include a plurality of gear teeth engaged with the first rack gear 231*b* and the second rack gear 232*b*. The pinion gear 320 may be disposed on the supporting member 310. For example, the pinion gear 320 may be coupled to the supporting member 310. The pinion gear 320 may be rotatable with respect to the supporting member 310 by a movement of the first lens support 231 and the second lens support 232. For example, the pinion gear 320 may be rotatable with respect to the supporting member 310, in a first rotation direction r1 and/or a second rotation direction r2. When the pinion gear 320 rotates, a distance between the first lens 231*a* and the second lens 232*a* may be changed. For example, when the pinion gear 320 rotates, the distance between the first lens 231*a* and the second lens 232*a* may be changed. The pinion gear 320 is engaged with the first rack gear 231*b* and the second rack gear 232*b* to maintain the distance between the first lens 231*a* and the second lens 232*a*. For example, the pinion gear 320 may restrict a movement of the first lens support 231 and the second lens support 232, by engaging with the first rack gear 231*b* and the second rack gear 232*b* before an external force (e.g., a force applied by a user) is applied to the first lens support 231 and the second lens support 232. For example, when the first lens support 231 moves in the first direction (e.g., +x direction) away from the second lens support 232, the first rack gear 231*b* may move with respect to the second rack gear 232*b* along the first direction (e.g., +x direction). The distance between the first lens 231*a* and the second lens 232*a* may be changed from a first distance d1 to a second distance d2, by a movement of the first rack gear 231*b* with respect to the second rack gear 232*b* in the first direction (e.g., +x direction).

The first distance d1 may indicate a first position of the first lens support 231 with respect to the second lens support 232. For example, the first distance d1 may be represented as the first position of the first lens support 231 with respect to the second lens support 232. The second distance d2 may indicate a second position of the first lens support 231 with respect to the second lens support 232. For example, the second distance d2 may be represented as the second position of the first lens support 231 with respect to the second lens support 232. The second distance d2 may be different from the first distance d1. For example, the second distance d2 may be greater than the first distance d1, but the second distance d2 is not limited thereto. For example, the second distance d2 may be less than the first distance d1. When the distance between the first lens 231*a* and the second lens 232*a* is changed from the first distance d1 to the second distance d2, the pinion gear 320 may rotate along the first rotation direction r1. For example, as the pinion gear 320 rotates along the first rotation direction r1, the distance between the first lens 231*a* and the second lens 232*a* may increase. For example, as the pinion gear 320 rotates along the first rotation direction r1, the first lens support 231 may move along the first direction (e.g., +x direction), and the second lens support 232 may move along the second direction (e.g., −x direction) opposite to the first direction (e.g., +x direction).

For example, when the first lens support 231 moves in the second direction (e.g., −x direction) approaching the second lens support 232, the first rack gear 231*b* may move with respect to the second rack gear 232*b* along the second direction (e.g., −x direction). The distance between the first lens 231*a* and the second lens 232*a* may be changed from the second distance d2 to the first distance d1 by a movement of the first rack gear 231*b* with respect to the second rack gear 232*b* in the second direction (e.g., −x direction). When the distance between the first lens 231*a* and the second lens 232*a* is changed from the second distance d2 to the first distance d1, the pinion gear 320 may rotate along the second rotation direction r2 opposite to the first rotation direction r1. For example, as the pinion gear 320 rotates along the second rotation direction r2, the distance between the first lens 231*a* and the second lens 232*a* may be reduced. For example, as the pinion gear 320 rotates along the second rotation direction r2, the first lens support 231 may move along the second direction (e.g., −x direction), and the second lens support 232 may move in the first direction (e.g., +x direction).

According to an embodiment, the first adjusting structure 330 and the second adjusting structure 340 may be configured to guide a movement of the first lens support 231 with respect to the second lens support 232. For example, since an inter pupillary distance is different for each user, the distance between the first lens support 231 and the second lens support 232 needs to be precisely adjusted (or changed). Hereinafter, the first adjusting structure 330 and/or the second adjusting structure 340 capable of precisely adjusting the distance between the first lens 231*a* and the second lens 232*a* will be described.

Hereinafter, the first adjusting structure 330 and the second adjusting structure 340 will be described based on the first lens support 231, but embodiments of the disclosure are not limited thereto. For example, the first adjusting structure 330 and the second adjusting structure 340 may be configured to guide a movement of the second lens support 232 with respect to the first lens support 231.

Figure 5A:
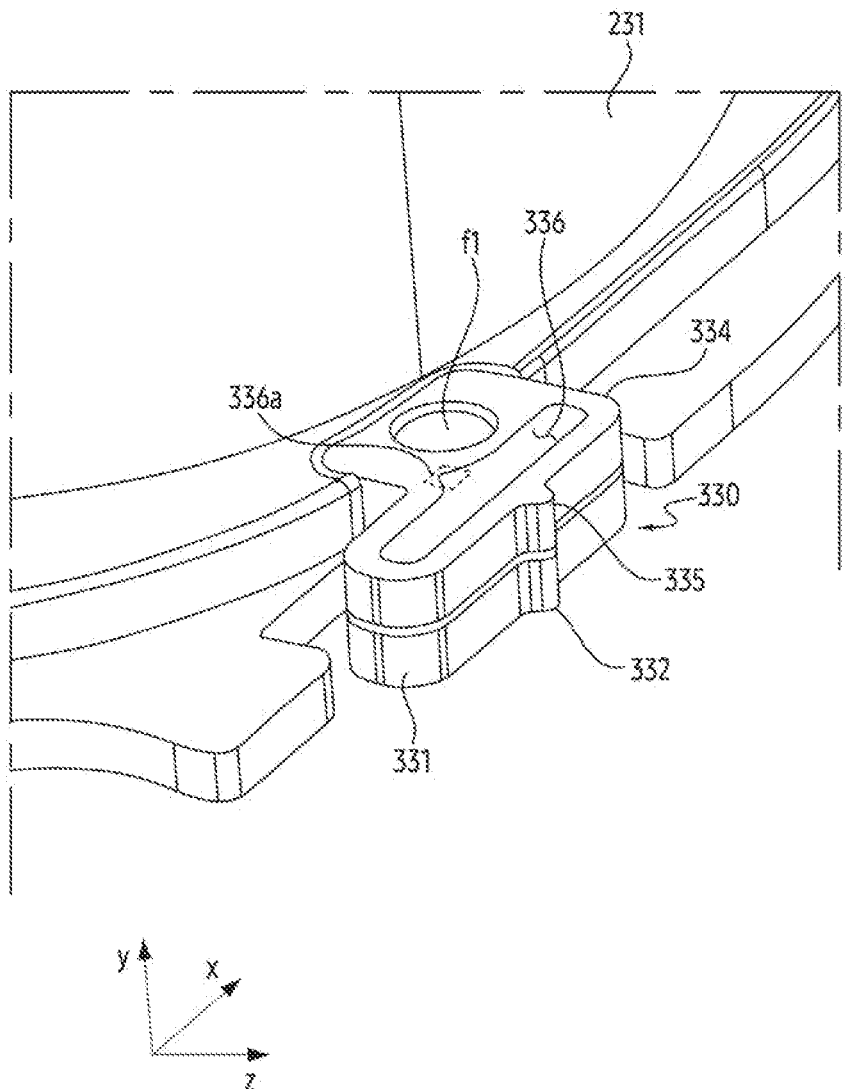
FIG. 5A illustrates an example first lens support and a first adjusting structure according to an embodiment.
Figure 5B:
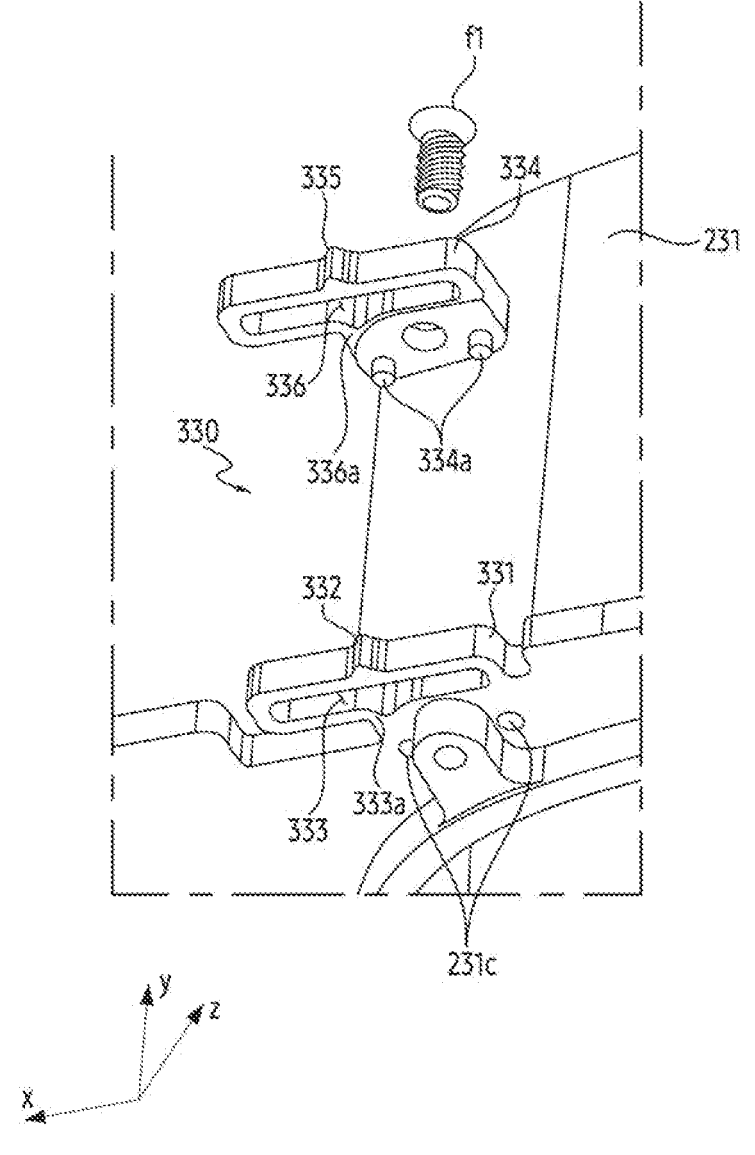
FIG. 5B illustrates a coupling relationship of an example first adjusting structure according to an embodiment.

FIG. 5A illustrates a first lens support and a first adjusting structure according to an embodiment. FIG. 5B illustrates a coupling relationship of an example first adjusting structure according to an embodiment.

Referring to FIGS. 5A and 5B, according to an embodiment, a first adjusting structure 330 may include a first flange part 331, a first protruding part 332, a first opening 333, a second flange part 334, a second protruding part 335, and a second opening 336.

Hereinafter, the first adjusting structure 330 will be described as being coupled to the first lens support 231, but the first adjusting structure 330 is not limited thereto. For example, the first adjusting structure 330 may be coupled to a supporting member (e.g., the supporting member 310 in FIGS. 4A and 4B). For example, the first adjusting structure 330 may be coupled to a second lens support (e.g., the second lens support 232 in FIG. 2B).

According to an embodiment, the first adjusting structure 330 may be coupled to the first lens support 231. For example, the first flange part 331, the first protruding part 332, and the first opening 333 of the first adjusting structure 330 may be integrally formed with the first lens support 231, but the first adjusting structure 330 is not limited thereto. For example, the first flange part 331, the first protruding part 332, and the first opening 333 may be formed separately from the first lens support 231, and then, coupled to the first lens support 231 through a fastening member f1 (e.g., screw, rivet, and/or pin). The second flange part 334, the second protruding part 335, and the second opening 336 may be formed separately from the first lens support 231, and then, coupled to the first lens support 231 through the fastening member f1, but the second flange part 334, the second protruding part 335, and the second opening 336 are not limited thereto. For example, the second flange part 334, the second protruding part 335, and the second opening 336 may be integrally formed with the first lens support 231.

According to an embodiment, the first flange part 331 may be connected to the first protruding part 332. The first flange part 331 may have a shape extending in a first direction (e.g., +x direction) or a second direction (e.g., −x direction). For example, the first flange part 331 may extend along the first direction (e.g., +x direction) or the second direction (e.g., −x direction) to have a length in the first direction (e.g., +x direction) or the second direction (e.g., −x direction). According to an embodiment, the first flange part 331 may be formed of a metal or polymer material. For example, the first flange part 331 may be formed of plastic.

According to an embodiment, the first protruding part 332 may protrude from the first flange part 331. For example, the first protruding part 332 may protrude to outside of the first flange part 331. For example, the first protruding part 332 may protrude (or extend) along a direction away from the first flange part 331. For example, the first protruding part 332 may protrude (or extend) in a direction away from the first opening 333.

According to an embodiment, the first opening 333 may penetrate the first flange part 331. The first opening 333 may be formed (or defined) in the first flange part 331. The first opening 333 may be surrounded (or covered) by the first flange part 331. As the first flange part 331 is penetrated by the first opening 333, the first flange part 331 may be deformable by an external force. For example, the first flange part 331 may be compressed by an external force. A shape of the first opening 333 may be deformed when a shape of the first flange part 331 is deformed.

According to an embodiment, the first opening 333 may include a first protruding area 333*a*. The first protruding area 333*a* may be formed to reduce damage caused by stress on the first flange part 331. For example, the first protruding area 333*a* may be formed to maintain a thickness of the first flange part 331 to be substantially constant. The thickness of the first flange part 331 may indicate a distance in a direction perpendicular to the extending direction when the first flange part 331 extends along the circumference of the first opening 333. The first protruding area 333*a* may correspond to the first protruding part 332. For example, a shape of the first protruding area 333*a* may correspond to the shape of the first protruding part 332. For example, a position of the first protruding area 333*a* may correspond to a position of the first protruding part 332. For example, the first protruding area 333*a* may be symmetrical to the first protruding part 332 based on the first direction (e.g., +x direction).

According to an embodiment, the second flange part 334 may be connected to the first protruding part 332. The second flange part 334 may have a shape extending along the first direction (e.g., +x direction) or a second direction (e.g., −x direction). For example, the second flange part 334 may have a length in the first direction (e.g., +x direction) or the second direction (e.g., −x direction) by extending along the first direction (e.g., +x direction) or the second direction (e.g., −x direction). According to an embodiment, the second flange part 334 may be disposed (or stacked) on the first flange part 331. The second flange part 334 may overlap with at least a part of the first flange part 331. The second flange part 334 may be aligned with the first flange part 331. For example, the second flange part 334 may be fully overlaid on the first flange part 331, but the second flange part 334 is not limited thereto. For example, the second flange part 334 may be misaligned with the first flange part 331. When the second flange part 334 and the first flange part 331 are misaligned with each other, a part of the second flange part 334 may not overlap with the first flange part 331. According to an embodiment, the second flange part 334 may be formed of a metal or polymer material. For example, the second flange part 334 may be formed of plastic.

According to an embodiment, the second flange part 334 may include at least one guide protrusion 334*a*. The guide protrusion 334*a* may protrude from the second flange part 334. For example, the guide protrusion 334*a* may extend along a direction (e.g., −y direction) toward the first flange part 331.

According to an embodiment, the second protruding part 335 may protrude from the second flange part 334. For example, the second protruding part 335 may protrude to the outside of the second flange part 334. For example, the second protruding part 335 may protrude (or extend) along a direction away from the second flange part 334. According to an embodiment, the second protruding part 335 may be disposed (or stacked) on the first protruding part 332. The second protruding part 335 may overlap with at least a part of the first protruding part 332. The second protruding part 335 may be aligned with the first protruding part 332. For example, the second protruding part 335 may be fully overlaid on the first protruding part 332, but the second protruding part 335 is not limited to thereto. For example, the second protruding part 335 may be misaligned with the first protruding part 332. When the second protruding part 335 and the first protruding part 332 are misaligned with each other, a part of the second protruding part 335 may not overlap with the first protruding part 332.

According to an embodiment, the second opening 336 may penetrate the second flange part 334. The second opening 336 may be formed (or defined) on the second flange part 334. The second opening 336 may be surrounded (or covered) by the second flange part 334. As the second flange part 334 is penetrated by the second opening 336, the second flange part 334 may be deformable by an external force. For example, the second flange part 334 may be compressed by an external force. A shape of the second opening 336 may be deformed when a shape of the second flange part 334 is deformed. According to an embodiment, the second opening 336 may be disposed (or stacked) on the first opening 333. The second opening 336 may overlap with at least a part of the first opening 333. The second opening 336 may be aligned with the first opening 333. The second opening 336 may be fully overlaid on the first opening 333, but the second opening 336 is not limited thereto. The second opening 336 may be misaligned with the first opening 333. When the second opening 336 and the first opening 333 are misaligned with each other, a part of the second opening 336 may not overlap with the first opening 333.

According to an embodiment, the second opening 336 may include a second protruding area 336a. The second protruding area 336a may be formed to reduce damage (e.g., caused by stress) on the second flange part 334. For example, the second protruding area 336a may be formed to maintain a thickness of the second flange part 334 to be substantially constant. The thickness of the second flange part 334 may indicate a distance in a direction perpendicular to the extending direction when the second flange part 334 extends along the circumference of the second opening 336. The second protruding area 336a may correspond to the second protruding part 335. For example, a shape of the second protruding area 336a may correspond to a shape of the second protruding part 335. For example, a position of the second protruding area 336a may correspond to a position of the second protruding part 335. For example, the second protruding area 336a may be symmetrical to the second protruding part 335 based on the first direction (e.g., +x direction).

According to an embodiment, the first lens support 231 may further include at least one guide hole 231c. The at least one guide hole 231c may penetrate the first lens support 231. The at least one guide hole 231c may correspond to at least one guide protrusion 334a. The at least one guide hole 231c may accommodate at least one guide protrusion 334a. The at least one guide protrusion 334a may be inserted into at least one guide hole 231c. When the first adjusting structure 330 is formed, the second flange part 334 may be stacked on the first flange part 331. For example, since at least one guide protrusion 334a of the second flange part 334 is inserted into at least one guide hole 231c, the second flange part 334 and the first flange part 331 may be aligned. As the fastening member f1 penetrates the first flange part 331 and the second flange part 334 after the second flange part 334 is stacked on the first flange part 331, production of the first adjusting structure 330 may be completed.

Figure 6A:
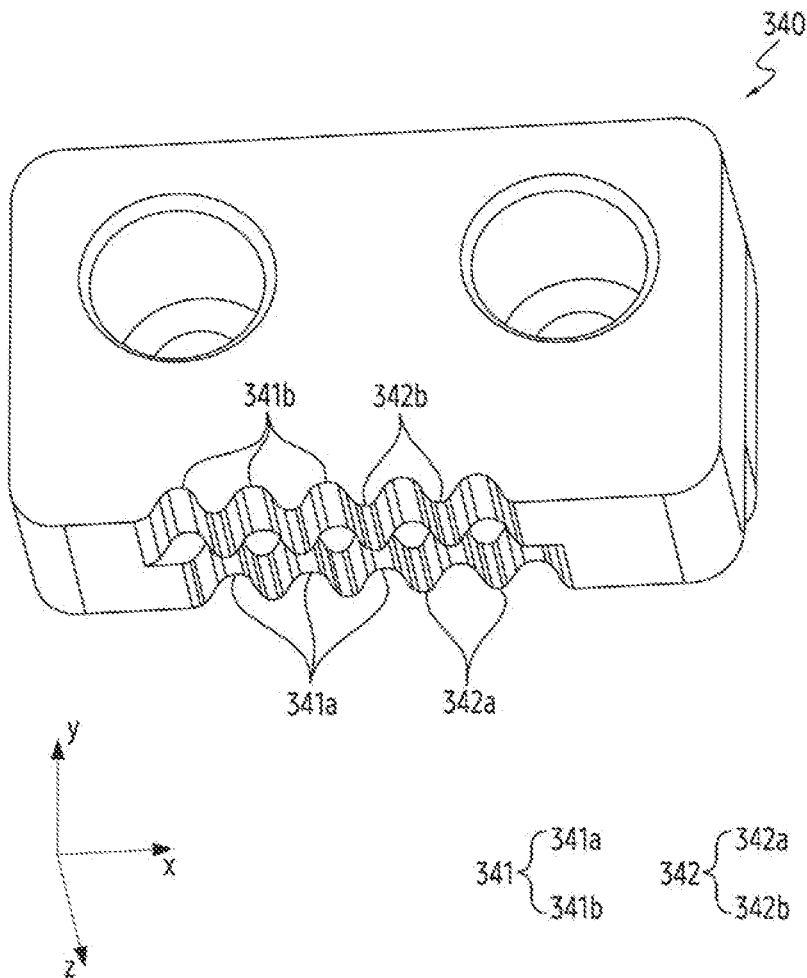
FIG. 6A is a perspective view illustrating an example second adjusting structure according to an embodiment.
Figure 6B:
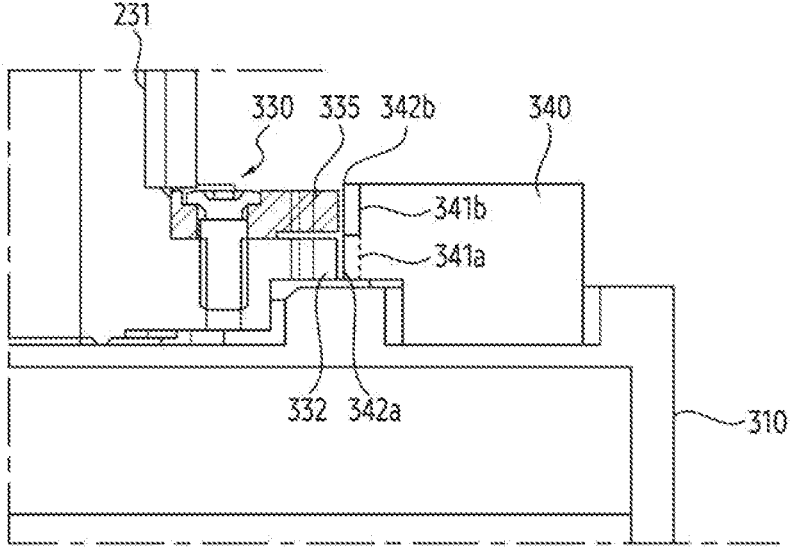
FIG. 6B is a cross-sectional view illustrating an example in which an example electronic device is cut along line A-A' of FIG. 4A, according to an embodiment.
Figure 6B:

FIG. 6A is a perspective view illustrating an example second adjusting structure according to an embodiment. FIG. 6B is a cross-sectional view illustrating an example in which an example electronic device is cut along line A-A' of FIG. 4A, according to an embodiment.

Referring to FIGS. 6A and 6B, a second adjusting structure 340 may include a plurality of grooves 341 (341a, 341b) and a plurality of protrusions 342 (342a, 342b).

According to an embodiment, the plurality of grooves 341 may be (arranged to be) spaced apart from each other. For example, the plurality of grooves 341 may be arranged to be spaced apart from each other along a first direction (e.g., +x direction) and/or a second direction (e.g., –x direction). According to an embodiment, the plurality of grooves 341 may include a plurality of first grooves 341a and a plurality of second grooves 341b.

According to an embodiment, the plurality of first grooves 341a may correspond to the first protruding part 332. The plurality of first grooves 341a may be arranged with respect to the first protruding part 332. For example, the plurality of first grooves 341a may face the first protruding part 332.

According to an embodiment, the plurality of second grooves 341b may correspond to a second protruding part 335. The plurality of second grooves 341b may be arranged with respect to the second protruding part 335. For example, the plurality of second grooves 341b may face the second protruding part 335. The plurality of second grooves 341b may be disposed (or stacked) on the plurality of first grooves 341a. According to an embodiment, each of the plurality of second grooves 341b may be misaligned with each of the plurality of first grooves 341a. For example, when each of the plurality of second grooves 341b and each of the plurality of first grooves 341a are misaligned with each other, a part of each of the plurality of second grooves 341b may not overlap with a part of each of a plurality of first grooves 341a.

According to an embodiment, the plurality of protrusions 342 may be spaced apart from each other. For example, the plurality of protrusions 342 may be arranged to be spaced apart from each other. For example, the plurality of protrusions 342 may be arranged to be spaced apart from each other along the first direction (e.g., +x direction), and/or the second direction (e.g., –x direction). The plurality of protrusions 342 may be disposed (or interposed) between the plurality of grooves 341. According to an embodiment, the plurality of protrusions 342 may include a plurality of first protrusions 342a and a plurality of second protrusions 342b.

According to an embodiment, the plurality of first protrusions 342a may correspond to the first protruding part 332. The plurality of first protrusions 342a may be arranged with respect to the first protruding part 332. For example, the plurality of first protrusions 342a may face the first protruding part 332. The plurality of first protrusions 342a may be disposed (or interposed) between the plurality of first grooves 341a. According to an embodiment, at least one of the plurality of second grooves 341b may be disposed (or stacked) on the plurality of first protrusions 342a. For example, the at least one groove of the plurality of second grooves 341b may overlap with the plurality of first protrusions 342a. For example, the plurality of first protrusions 342a may be referred to as 'a plurality of first gear teeth.'

According to an embodiment, the plurality of second protrusions 342b may correspond to the second protruding part 335. The plurality of second protrusions 342b may be arranged with respect to the second protruding part 335. For example, the plurality of second protrusions 342b may face the second protruding part 335. The plurality of second protrusions 342b may be disposed (or interposed) between the plurality of second grooves 341b. The plurality of second protrusions 342b may be disposed (or stacked) on the plurality of first protrusions 342a. According to an embodiment, each of the plurality of second protrusions 342b may be misaligned with each of the plurality of first protrusions 342a. For example, when each of the plurality of second protrusions 342b is misaligned with each of the plurality of first protrusions 342a, a part of each of the plurality of second protrusions 342b may not overlap with a part of each of the plurality of first protrusions 342a. According to an embodiment, the plurality of second protrusions 342b may be disposed (or stacked) on the plurality of first grooves 341*a*. For example, the plurality of second protrusions 342*b* may overlap with the plurality of first grooves 341*a*. The plurality of second protrusions 342*b* may be referred to as a plurality of second gear teeth.

According to an embodiment, the first adjusting structure 330 and the second adjusting structure 340 may be coupled to the supporting member 310. The first adjusting structure 330 and the second adjusting structure 340 may be located inside the supporting member 310. The first adjusting structure 330 and the second adjusting structure 340 may be disposed on the supporting member 310.

Figure 7A:
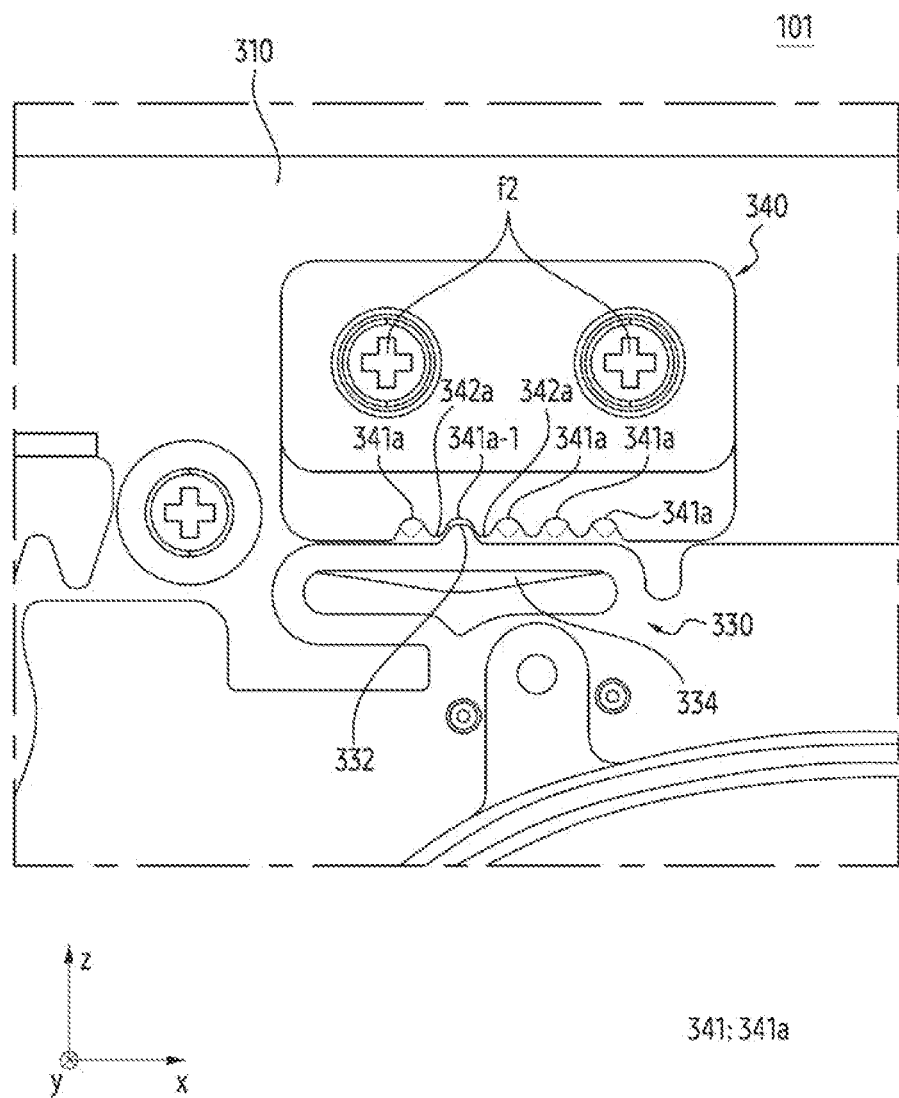
FIG. 7A is a top plan view illustrating a relationship between a first adjusting structure and a second adjusting structure when a distance between an example first lens and an example second lens is a first distance, according to an embodiment.
Figure 7B:
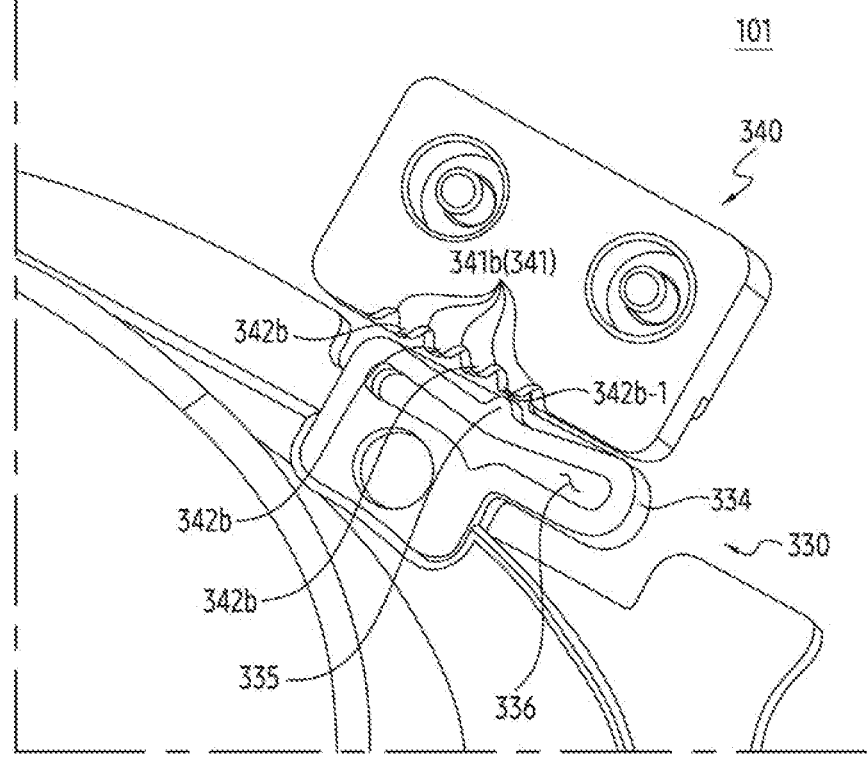
FIG. 7B is a rear view illustrating a relationship between a first example adjusting structure and an example second adjusting structure when a distance between a first lens and a second lens is a first distance, according to an embodiment.
Figure 7B:
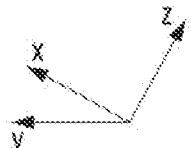
Figure 7C:
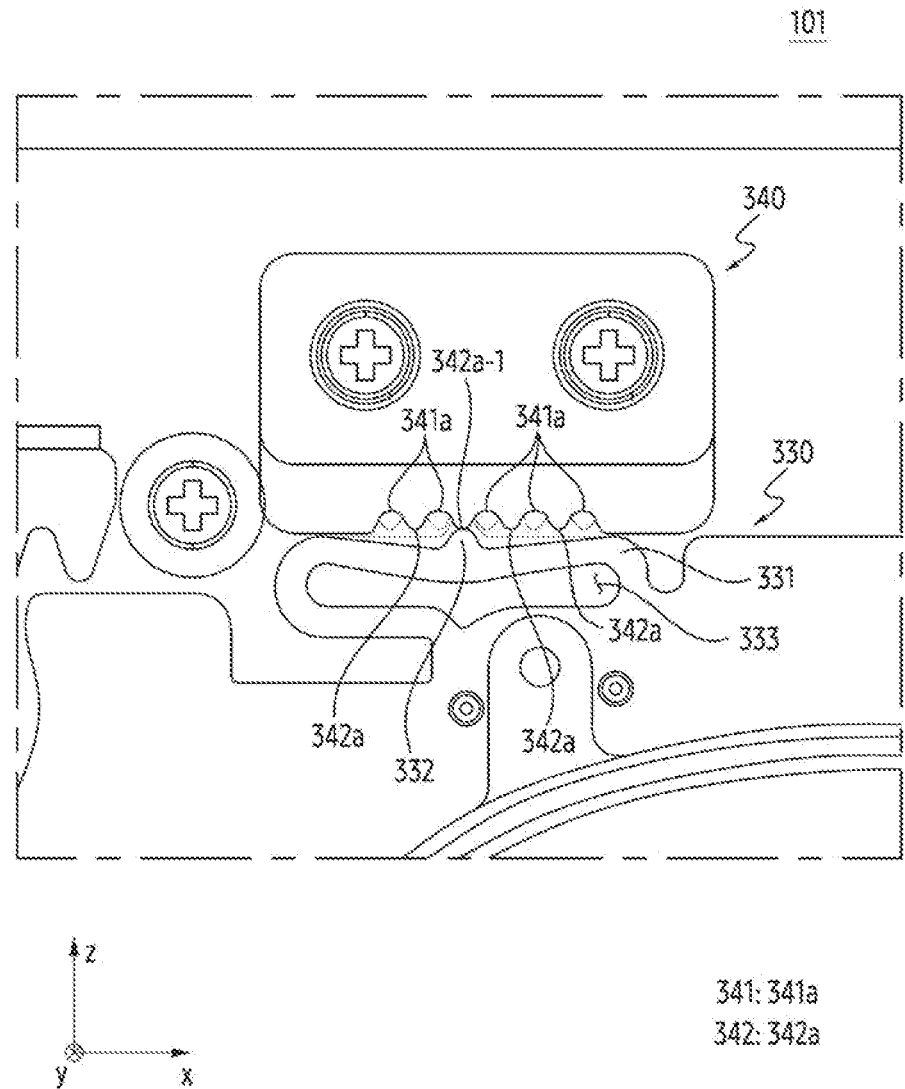
FIG. 7C is a top plan view illustrating a relationship between a first example adjusting structure and an example second adjusting structure when a distance between a first lens and a second lens is a second distance, according to an embodiment.
Figure 7D:
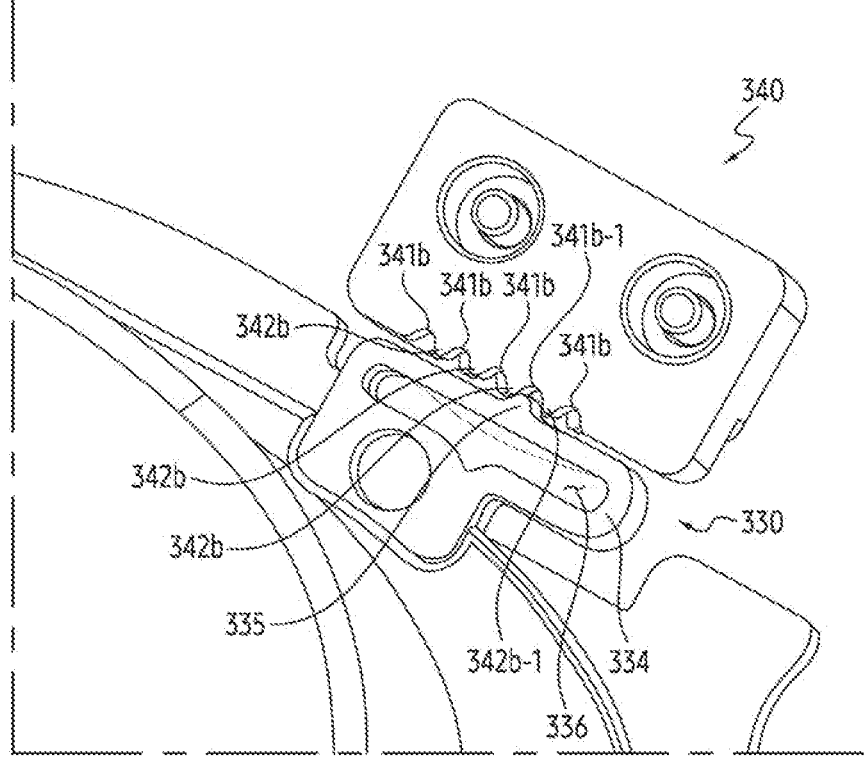
FIG. 7D is a rear view illustrating a relationship between a first example adjusting structure and a second example adjusting structure when a distance between a first lens and a second lens is a second distance, according to an embodiment.
Figure 7D:

FIG. 7A is a top plan view illustrating a relationship between a first adjusting structure and a second adjusting structure when a distance between a first lens and a second lens is a first distance, according to an embodiment. FIG. 7B is a rear view illustrating a relationship between a first adjusting structure and a second adjusting structure when a distance between a first lens and a second lens is a first distance, according to an embodiment. FIG. 7C is a top plan view illustrating a relationship between a first adjusting structure and a second adjusting structure when a distance between a first lens and a second lens is a second distance, according to an embodiment. FIG. 7D is a rear view illustrating a relationship between a first adjusting structure and a second adjusting structure when a distance between a first lens and a second lens is a second distance, according to an embodiment.

Referring to FIG. 7A, according to an embodiment, a second adjusting structure 340 may be fastened on the supporting member 310. A position of the second adjusting structure 340 may be maintained when the first adjusting structure 330 moves with respect to the second adjusting structure 340. For example, the second adjusting structure 340 may be fixed when the first adjusting structure 330 moves with respect to the supporting member 310. For example, the second adjusting structure 340 may be fastened to the supporting member 310 by at least one fastening member f2 penetrating the second adjusting structure 340 and supporting member 310.

According to an embodiment, when a distance between a first lens (e.g., the first lens 231*a* of FIG. 2B) and a second lens (e.g., the second lens 232*a* of FIG. 2B) is a first distance (e.g., the first distance d1 of FIG. 4A), the first protruding part 332 may be positioned (or accommodated) inside a groove 341*a*-1 of the plurality of grooves (e.g., the plurality of first grooves 341*a*). For example, when the distance between the first lens 231*a* and the second lens 232*a* is the first distance d1, the first protruding part 332 may be positioned between the plurality of first protrusions 342*a*. For example, when the distance between the first lens 231*a* and the second lens 232*a* is the first distance d1, the first protruding part 332 may be engaged with the plurality of first protrusions 342*a*. As the first protruding part 332 and a plurality of first protrusions 342*a* are engaged with each other, the distance between the first lens 231*a* and the second lens 232*a* may be maintained at the first distance d1.

Referring to FIG. 7B, according to an embodiment, when the distance between the first lens 231*a* and the second lens 232*a* is the first distance d1, the second protruding part 335 may be positioned outside the plurality of grooves 341 (341*b*). For example, when the distance between the first lens 231*a* and the second lens 232*a* is the first distance d1, as the second flange part 334 is deformed by a contact with the second adjusting structure 340, the second protruding part 335 may be positioned outside the plurality of second grooves 341*b*. When the distance between the first lens 231*a* and the second lens 232*a* is the first distance d1, the second flange part 334 may be deformed in a direction away from the second adjusting structure 340 (e.g., −z direction) by a contact between the second adjusting structure 340 and the second protruding part 335. For example, when the distance between the first lens 231*a* and the second lens 232*a* is the first distance d1, the second flange part 334 may be deformed in a direction away from the plurality of second protrusions 342*b* (e.g., −z direction) by a contact between a protrusion 342*b*-1 of the plurality of second protrusions 342*b* and the second protruding part 335. For example, when the distance between the first lens 231*a* and the second lens 232*a* is the first distance d1, the second flange part 334 may be compressed by a contact with the second adjusting structure 340. A shape of the second opening 336 may be changed by a deformation of the second flange part 334. For example, the second opening 336 may be compressed by the deformation of the second flange part 334. For example, when the distance between the first lens 231*a* and the second lens 232*a* is the first distance d1, the engagement between the second protruding part 335 and the plurality of second protrusions 342*b* may be released.

According to an embodiment, as the first lens support 231 moves with respect to the second lens support 232 in a first direction (e.g., +x direction), the distance between the first lens 231*a* and the second lens 232*a* may be changed from the first distance d1 to a second distance (e.g., the second distance d2 of FIG. 4B).

Referring to FIG. 7C, according to an embodiment, when the distance between the first lens 231*a* and the second lens 232*a* is the second distance d2, the first protruding part 332 may be positioned outside the plurality of grooves 341. For example, when the distance between the first lens 231*a* and the second lens 232*a* is the second distance d2, as the first flange part 331 is deformed by a contact with the protrusion 342*a*-1 among the plurality of protrusions 342, the first protruding part 332 may be positioned outside the plurality of grooves 341. For example, when the distance between the first lens 231*a* and the second lens 232*a* is changed from the first distance d1 to the second distance d2, the first protruding part 332 may move toward the outside of the plurality of first grooves 341*a* by sliding to the protrusion 342*a*-1 among the plurality of first protrusions 342*a*. The first flange part 331 may be deformed in a direction (e.g., −z direction) away from the plurality of protrusions 342 by a contact between the first protruding part 332 and the protrusion 342*a*-1 among the plurality of first protrusions 342*a*. For example, the first flange part 331 may be compressed by a contact between the first protruding part 332 and the protrusion 342*a*-1 among the plurality of protrusions 342. A shape of the first opening 333 may be changed by the deformation of the first flange part 331. For example, the first opening 333 may be compressed as the first flange part 331 is compressed. For example, when the distance between the first lens 231*a* and the second lens 232*a* is the second distance d2, the engagement between the first protruding part 332 and the plurality of first protrusions 342*a* may be released.

Referring to FIG. 7D, according to an embodiment, when the distance between the first lens 231*a* and the second lens 232*a* is the second distance d2, the second protruding part 335 may be positioned (or accommodated) inside yet another groove 341*b*-1 among the plurality of grooves 341. For example, when the distance between the first lens 231*a* and the second lens 232*a* is the second distance d2, the second protruding part 335 may be positioned (or accommodated) inside the yet another groove 341*b*-1 among the plurality of second grooves 341*b*. For example, when the distance between the first lens 231*a* and the second lens 232*a* is the second distance d2, the second protruding part 335 may be positioned between the plurality of second protrusions 342*b*. For example, the second protruding part 335 may be engage with the plurality of first protrusions 342*a* When the distance between the first lens 231*a* and the second lens 232*a* is the second distance d2. For example, when the distance between the first lens 231*a* and the second lens 232*a* is changed from the first distance d1 to the second distance d2, the second protruding part 335 may move toward the inside of the other groove 341*b*-1 among the plurality of second grooves 341*b* by sliding to the protrusion 342*b*-1 of the plurality of second protrusions 342*b*. When the distance between the first lens 231*a* and the second lens 232*a* is changed from the first distance d1 to the second distance d2, as a contact between the second protruding part 335 and the protrusion 342*b*-1 of the plurality of second protrusions 342*b* is released, a shape of the second flange part 334 may be restored. As the shape of the second flange part 334 is restored, a shape of the second opening 336 may be restored. As the second protruding part 335 and the plurality of first protrusions 342*a* are engaged with each other, the distance between the first lens 231*a* and the second lens 232*a* may be maintained at the second distance d2.

As described above, according to an embodiment, as the plurality of first protrusions 342*a* and the plurality of second protrusions 342*b* are misaligned with each other, the electronic device 101 may provide a structure in which a distance between the first lens 231*a* and the second lens 232*a* is precisely adjusted. When the plurality of first protrusions 342*a* and the plurality of second protrusions 342*b* are aligned, when the distance between the first lens 231*a* and the second lens 232*a* is the first distance d1 and the second distance d2, the first protruding part 332 and the second protruding part 335 may be positioned to be aligned with each other. When the first protruding part 332 and the second protruding part 335 are positioned to be aligned with each other. When the distance between the first lens 231*a* and the second lens 232*a* is the first distance d1 and the second distance d2, the distance between the first lens 231*a* and the second lens 232*a* may not be precisely adjusted. According to an embodiment, since the plurality of first protrusions 342*a* and the plurality of second protrusions 342*b* are misaligned with each other, the electronic device 101 may provide a structure in which the first protruding part 332 and the second protruding part 335 are misaligned with each other when the distances between the first lens 231*a* and the second lens 232*a* are the first distance d1 and the second distance d2, respectively. Since the first protruding part 332 and the second protruding part 335 are misaligned with each other when the distances between the first lens 231*a* and the second lens 232*a* are the first distance d1 and the second distance d2, respectively, the distance between the first lens 231*a* and the second lens 232*a* may be precisely adjusted.

Figure 8A:
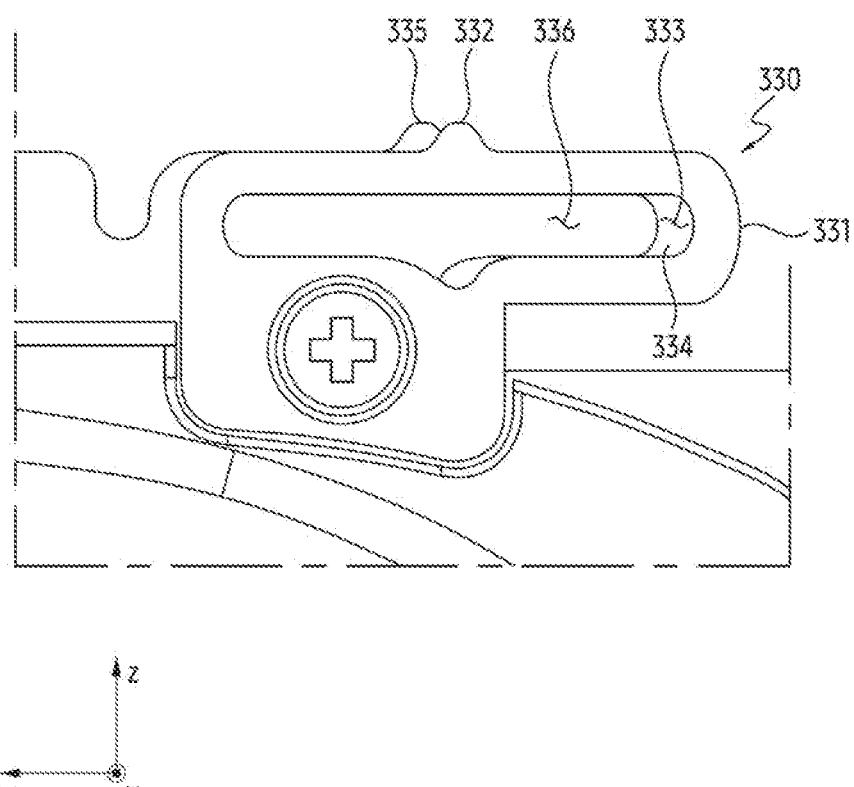
FIG. 8A is a top plan view illustrating an example first adjusting structure according to an embodiment.
Figure 8B:
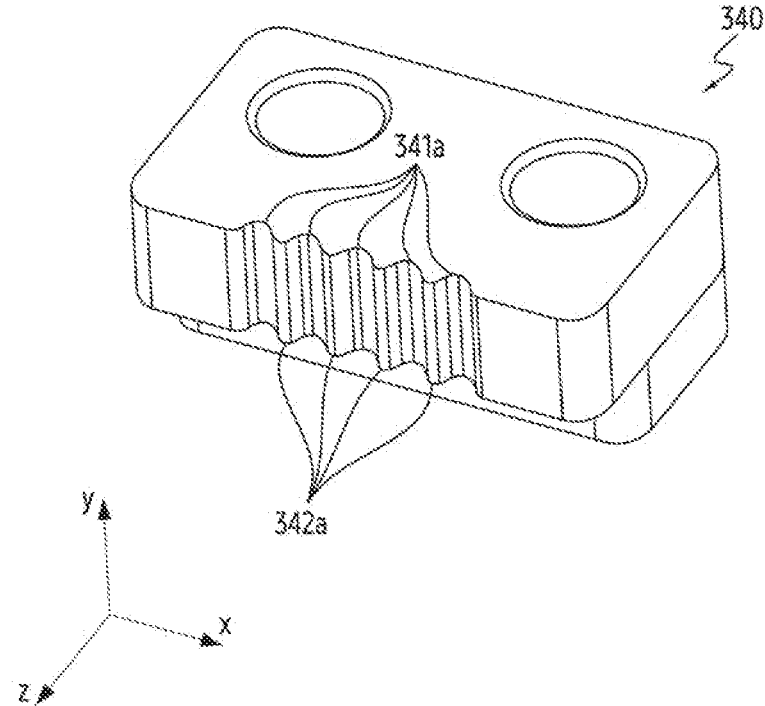
FIG. 8B is a perspective view illustrating an example second adjusting structure according to an embodiment.

FIG. 8A is a top plan view illustrating an example first adjusting structure according to an embodiment. FIG. 8B is a perspective view illustrating an example second adjusting structure according to an embodiment.

The first adjusting structure 330 of FIG. 8A may be a structure in which the structure of the first adjusting structure 330 of FIGS. 4A and/or 4B is changed, so redundant descriptions will be omitted.

The second adjusting structure 340 of FIG. 8B may be a structure in which the structure of the second adjusting structure 340 of FIGS. 4A and/or 4B is changed, so redundant descriptions will be omitted.

Referring to FIG. 8A, according to an embodiment, the first flange part 331 (shown in FIG. 7C) and the second flange part 334 may be misaligned with respect to each other. For example, at least a part of the first flange part 331 may not overlap with the second flange part 334. For example, when the first adjusting structure 330 is viewed from above, at least a part of the second flange part 334 may be spaced apart from the first flange part 331 along a first direction (e.g., +x direction).

According to an embodiment, the first protruding part 332 and the second protruding part 335 may be misaligned with each other. For example, at least a part of the first protruding part 332 may not overlap with the second protruding part 335. For example, when the first adjusting structure 330 is viewed from above, at least a part of the second protruding part 335 may be spaced apart from the first protruding part 332 along a first direction (e.g., +x direction).

According to an embodiment, the first opening 333 and the second opening 336 may be misaligned with respect to each other. For example, at least a part of the first opening 333 may not overlap with the second opening 336. For example, when the first adjusting structure 330 is viewed from above, at least a part of the second opening 336 may be spaced apart from the first opening 333 along the first direction (e.g., +x direction).

Referring to FIG. 8B, according to an embodiment, a thickness of a plurality of first grooves 341*a* may correspond to a sum of a thickness of the first protruding part 332 and a thickness of the second protruding part 335. A thickness of one component may indicate a distance in +y direction, and the corresponding expression may be used substantially the same hereinafter. For example, the thickness of the plurality of first grooves 341*a* may be greater than or equal to the sum of the thicknesses of the first protruding part 332 and the thickness of the second protruding part 335.

According to an embodiment, the thickness of the plurality of first protrusions 342*a* may correspond to the sum of the thickness of the first protruding part 332 and the thickness of the second protruding part 335. For example, the thickness of the plurality of first protrusions 342*a* may be greater than or equal to the sum of the thickness of the first protruding part 332 and the thickness of the second protruding part 335.

Figure 9A:
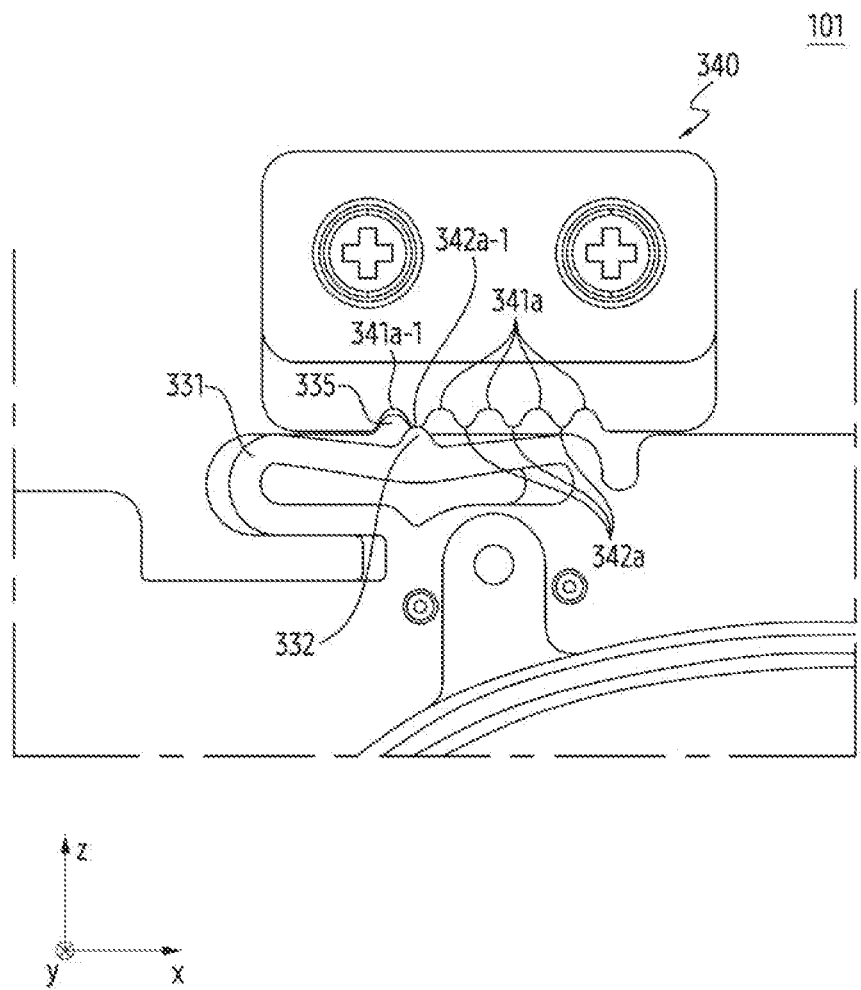
FIG. 9A is a rear view illustrating a relationship between an example first adjusting structure and a second example adjusting structure when a distance between a first lens and a second lens is a first distance, according to an embodiment.
Figure 9B:
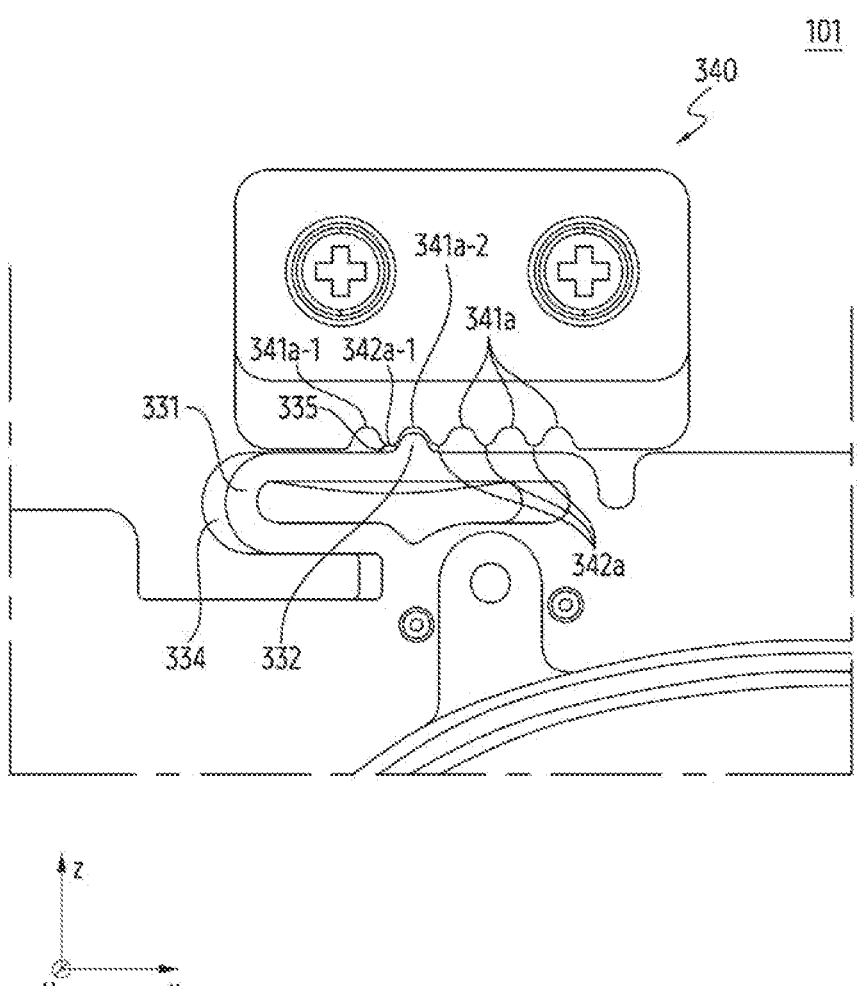
FIG. 9B is a rear view illustrating a relationship between a first example adjusting structure and a second example adjusting structure when a distance between a first lens and a second lens is a second distance, according to an embodiment.

FIG. 9A is a rear view illustrating a relationship between a first adjusting structure and a second adjusting structure when a distance between a first lens and a second lens is a first distance, according to an embodiment. FIG. 9B is a rear view illustrating a relationship between a first adjusting structure and a second adjusting structure when a distance between a first lens and a second lens is a second distance, according to an embodiment.

FIGS. 9A and 9B illustrate a relationship between the first adjusting structure 330 in FIG. 8A and the second adjusting structure 340 in FIG. 8B, according to a distance between a first lens (e.g., the first lens 231*a* of FIG. 2B) and a second lens (e.g., the second lens 232*a* of FIG. 2B).

Referring to FIG. 9A, according to an embodiment, when the distance between the first lens 231*a* and the second lens 232*a* is a first distance (e.g., the first distance d1 of FIG. 4A), the first protruding part 332 may be positioned outside a plurality of first grooves 341*a*. When the distance between the first lens 231*a* and the second lens 232*a* is the first distance d1, as the first flange part 331 is deformed by a contact between the first protruding part 332 and the second adjusting structure 340, the first protruding part 332 may be positioned outside the plurality of first grooves 341*a*. For example, when the distance between the first lens 231*a* and the second lens 232*a* is the first distance d1, the first flange part 331 may be deformed in a direction (e.g., −z direction) away from the plurality of first protrusions 342*a* by a contact between the first protruding part 332 and the protrusion 342*a*-1 among the plurality of first protrusions 342*a*. When the distance between the first lens 231*a* and the second lens 232*a* is the first distance d1, the first protruding part 332 may be positioned outside the plurality of first grooves 341*a* by being deformed in the direction (e.g., −z direction) away from the plurality of first protrusions 342*a*. When the distance between the first lens 231*a* and the second lens 232*a* is the first distance d1, the engagement between the first protruding part 332 and the plurality of first protrusions 342*a* may be released.

According to an embodiment, when the distance between the first lens 231*a* and the second lens 232*a* is the first distance d1, the second protruding part 335 may be positioned (or accommodated) inside the groove 341*a*-1 among the plurality of first grooves 341*a*. When the distance between the first lens 231*a* and the second lens 232*a* is the first distance d1, the second protruding part 335 may be positioned between the plurality of first protrusions 342*a*. When the distance between the first lens 231*a* and the second lens 232*a* is the first distance d1, the second protruding part 335 may be engaged with (any one of) the plurality of first protrusions 342*a*. As the second protruding part 335 and (any one of) the plurality of first protrusions 342*a* are engaged with each other, the distance between the first lens 231*a* and the second lens 232*a* may be maintained at the first distance d1.

According to an embodiment, as the first lens support 231 moves with respect to the second lens support 232 in the first direction (e.g., +x direction), the distance between the first lens 231*a* and the second lens 232*a* may be changed from the first distance d1 to the second distance d2.

Referring to FIG. 9B, according to an embodiment, when the distance between the first lens 231*a* and the second lens 232*a* is the second distance d2, the first protruding part 332 may be positioned (or accommodated) inside another groove 341*a*-2 among the plurality of first grooves 341*a*. For example, when the distance between the first lens 231*a* and the second lens 232*a* is changed from the first distance d1 to the second distance d2, the first protruding part 332 may move toward the inside of the other groove 341*a*-2 among the plurality of first grooves 341*a* by sliding to the protrusion 342*a*-1 of the plurality of first protrusions 342*a*. For example, when the distance between the first lens 231*a* and the second lens 232*a* is the second distance d2, the first protruding part 332 may be engaged with the plurality of first protrusions 342*a*.

According to an embodiment, when the distance between the first lens 231*a* and the second lens 232*a* is the second distance d2, the second protruding part 335 may be positioned outside the plurality of first grooves 341*a*. For example, when the distance between the first lens 231*a* and the second lens 232*a* is the second distance d2, as the second flange part 334 is deformed by a contact with the second adjusting structure 340, the second protruding part 335 may be positioned outside the plurality of first grooves 341*a*. For example, when the distance between the first lens 231*a* and the second lens 232*a* is the second distance d2, the second flange part 334 may be deformed in a direction (e.g., −z direction) away from the plurality of first protrusions 342*a* by a contact between the second protruding part 335 and the protrusion 342*a*-1 among the plurality of first protrusions 342*a*. For example, when the distance between the first lens 231*a* and the second lens 232*a* is changed from the first distance d1 to the second distance d2, the second protruding part 335 may slide with respect to the protrusion 342*a*-1 among the plurality of first protrusions 342*a*, by moving from the groove 341*a*-1 among the plurality of first grooves 341*a* in the first direction (e.g., +x direction). When the distance between the first lens 231*a* and the second lens 232*a* is changed from the first distance d1 to the second distance d2, the second protruding part 335 may be positioned outside the plurality of first grooves 341*a* by sliding with respect to the protrusion 342*a*-1 among the plurality of first protrusions 342*a*. When the distance between the first lens 231*a* and the second lens 232*a* is the second distance d2, as the second flange part 334 is deformed in a direction (e.g., −z direction) away from the plurality of first protrusions 342*a*, the second protruding part 335 may be positioned outside the plurality of first grooves 341*a*. When the distance between the first lens 231*a* and the second lens 232*a* is the second distance d2, the engagement between the second protruding part 335 and (any one of) the plurality of first protrusions 342*a* may be released.

As described above, according to an embodiment, the electronic device 101 may provide a structure in which a distance between the first lens 231*a* and the second lens 232*a* may be precisely adjusted by the first protruding part 332 and the second protruding part 335, which are misaligned with each other.

Figure 10:
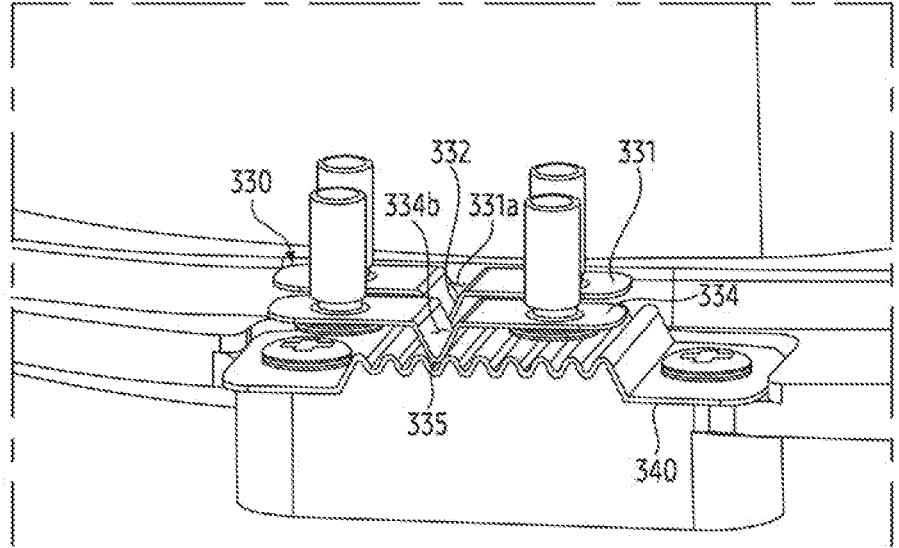
FIG. 10 is a perspective view illustrating an example first adjusting structure and an example second adjusting structure, according to an embodiment.
Figure 10:
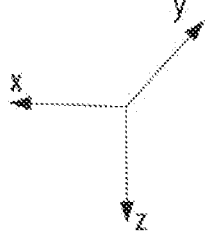

FIG. 10 is a perspective view illustrating a first adjusting structure and a second adjusting structure, according to an embodiment.

The first adjusting structure 330 of FIG. 10 may be a structure in which the structure of the first adjusting structure 330 of FIG. 8A is changed, so redundant descriptions will be omitted.

The second adjusting structure 340 of FIG. 10 may be a second adjusting structure in which the structure of the second adjusting structure 340 of FIG. 8B is changed, so redundant descriptions will be omitted.

Referring to FIG. 10, according to an embodiment, the first adjusting structure 330 may be deformable. For example, the first flange part 331 and the first protruding part 332 may be formed by a plate, which is to be bent. For example, the second flange part 334 and the second protruding part 335 may be formed by a plate, which is to be bent.

According to an embodiment, the first flange part 331 may include a first deformation groove 331*a*. The first deformation groove 331*a* may be formed at a position where a plate forming the first flange part 331 and the first protruding part 332 is bent. For example, the first deformation groove 331*a* may be surrounded (or covered) by the first protruding part 332. A shape of the first deformation groove 331*a* may be changed according to deformation of the first flange part 331.

According to an embodiment, the second flange part 334 may include a second deformation groove 334*b*. The second deformation groove 334*b* may be formed in a position where a plate forming the second flange part 334 and the second protruding part 335 is bent. For example, the second deformation groove 334*b* may be surrounded (or covered) by the second protruding part 335. A shape of the second deformation groove 334*b* may be changed according to deformation of the second flange part 334.

According to an embodiment, the second adjusting structure 340 may be deformable. For example, the second adjusting structure 340 may be formed by a plate, which is to be bent. For example, the second adjusting structure 340 may be transformable along a direction (e.g., +y direction)

approaching to the first adjusting structure 330 and/or a direction (e.g., −y direction) away from the first adjusting structure 330.

Figure 11A:
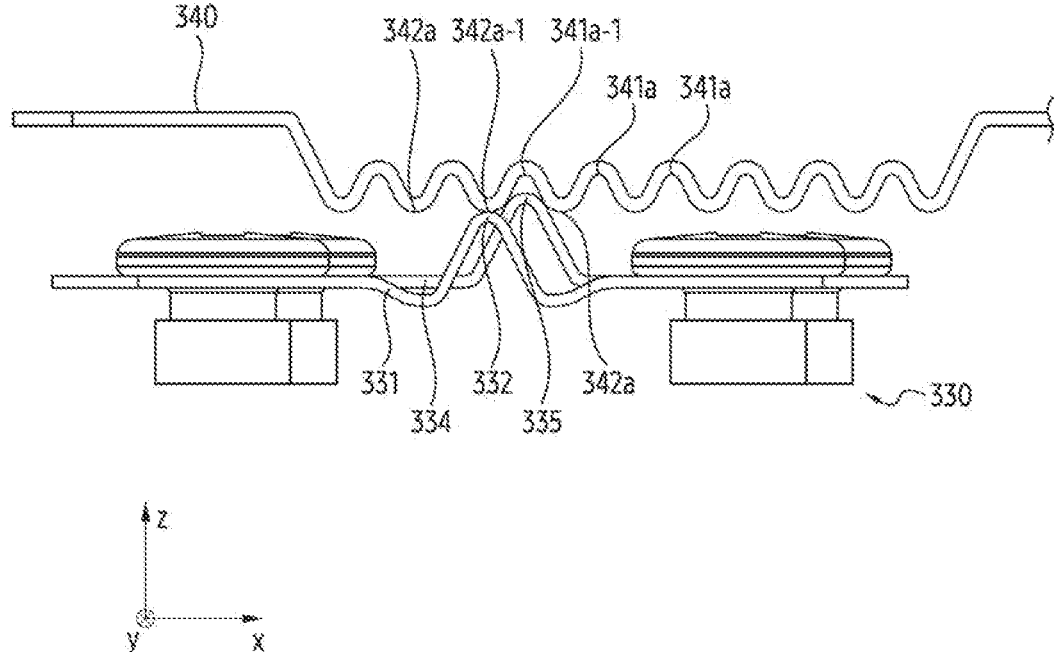
FIG. 11A is a cross-sectional view illustrating a relationship between an example first adjusting structure and an example second adjusting structure when a distance between a first lens and a second lens is a first distance, according to an embodiment.
Figure 11B:
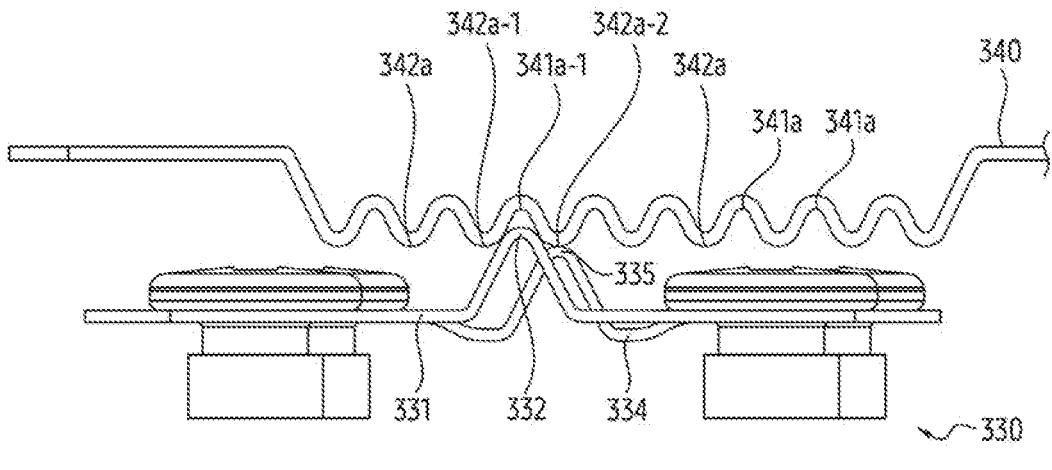
FIG. 11B is a cross-sectional view illustrating a relationship between an example first adjusting structure and an example second adjusting structure when a distance between a first lens and a second lens is a second distance, according to an embodiment.
Figure 11B:

FIG. 11A is a cross-sectional view illustrating a relationship between a first adjusting structure and a second adjusting structure when a distance between a first lens and a second lens is a first distance, according to an embodiment. FIG. 11B is a cross-sectional view illustrating a relationship between a first adjusting structure and a second adjusting structure when a distance between a first lens and a second lens is a second distance, according to an embodiment.

FIGS. 11A and 11B illustrate a relationship between the first adjusting structure 330 of FIG. 10 and the second adjusting structure 340 of FIG. 10, based on a distance between a first lens (e.g., the first lens 231*a* of FIG. 2B) and a second lens (e.g., the second lens 232*a* of FIG. 2B).

Referring to FIG. 11A, according to an embodiment, when the distance between the first lens 231*a* and the second lens 232*a* is a first distance (e.g., the first distance d1 of FIG. 4A), as the first flange part 331 is deformed by a contact between the protrusion 342*a*-1 among a plurality of the first protrusions 342*a* and a part of the first protruding part 332, a part of the first protruding part 332 may be positioned outside the plurality of first grooves 341*a*. For example, when the distance between the first lens 231*a* and the second lens 232*a* is the first distance d1, the first flange part 331 may be deformed in a direction (e.g., −z direction) away from the plurality of first protrusions 342*a*, by a contact between the protrusion 342*a*-1 among the plurality of first protrusions 342*a* and the first protruding part 332. The second adjusting structure 340 may be deformed by a contact with a part of the first protruding part 332. For example, the second adjusting structure 340 may be deformed in a direction away from the first protruding part 332, by a contact with a part of the first protruding part 332.

According to an embodiment, when the distance between the first lens 231*a* and the second lens 232*a* is the first distance d1, a part of the second protruding part 335 may be positioned (or accommodated) inside the groove 341*a*-1 among the plurality of first grooves 341*a*. When the distance between the first lens 231*a* and the second lens 232*a* is the first distance d1, a part of the second protruding part 335 may be positioned between the plurality of first protrusions 342*a*.

According to an embodiment, as the first lens support 231 moves with respect to the second lens support 232 in a first direction (e.g., +x direction), the distance between the first lens 231*a* and the second lens 232*a* may be changed from the first distance d1 to the second distance d2.

Referring to FIG. 11B, according to an embodiment, when the distance between the first lens 231*a* and the second lens 232*a* is the second distance d2, a part of the first protruding part 332 may be positioned (or accommodated) inside the groove 341*a*-1 among the plurality of first grooves 341*a*. For example, when the distance between the first lens 231*a* and the second lens 232*a* is changed from the first distance d1 to the second distance d2, a part of the first protruding part 332 may move toward the inside of a groove 341*a*-1 among the plurality of first grooves 341*a*, by sliding to the protrusion 342*a*-1 among the plurality of first protrusions 342*a*. For example, when the distance between the first lens 231*a* and the second lens 232*a* is the second distance d2, a part of the second protruding part 335 may be engaged with (any one of) the plurality of first protrusions 342*a*.

According to an embodiment, when the distance between the first lens 231*a* and the second lens 232*a* is the second distance d2, a part of the second protruding part 335 may be positioned outside the plurality of first grooves 341*a*. For example, when the distance between the first lens 231*a* and the second lens 232*a* is the second distance d2, as the second flange part 334 is deformed by a contact with the second adjusting structure 340, a part of the second protruding part 335 may be positioned outside the plurality of first grooves 341*a*. For example, when the distance between the first lens 231*a* and the second lens 232*a* is the second distance d2, the second flange part 334 may be deformed in a direction (e.g., −z direction) away from the plurality of first protrusions 342*a*, by a contact between another protrusion 342*a*-2 among the plurality of first protrusions 342*a* and a part of the second protruding part 335. When the distance between the first lens 231*a* and the second lens 232*a* is the second distance d2, as the second flange part 334 is deformed in a direction (e.g., −z direction) away from the plurality of first protrusions 342*a*, a part of the second protruding part 335 may be positioned outside the plurality of first grooves 341*a*. When the distance between the first lens 231*a* and the second lens 232*a* is the second distance d2, the engagement between a part of the second protruding part 335 and (any one of) the plurality of first protrusions 342*a* may be released.

As described above, according to an embodiment, the electronic device (e.g., the electronic device 101 of FIGS. 2A, 2B, and 2C) may provide a structure in which a distance between the first lens 231*a* and the second lens 232*a* may be precisely adjusted by the first protruding part 332 and the second protruding part 335 which are misaligned with each other.

Figure 12A:
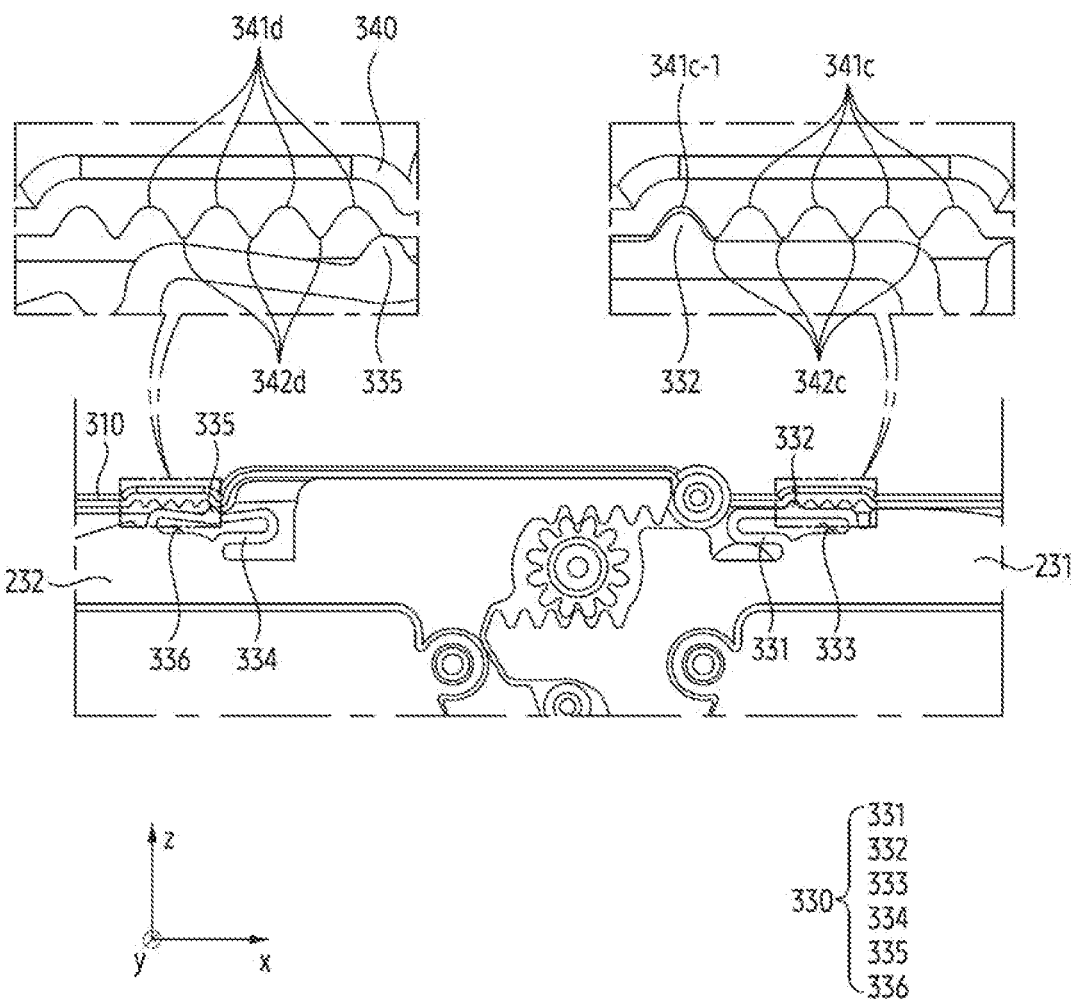
FIG. 12A is a cross-sectional view illustrating a relationship between a first example adjusting structure and a second example adjusting structure when a distance between a first lens and a second lens is a first distance, according to an embodiment.
Figure 12B:
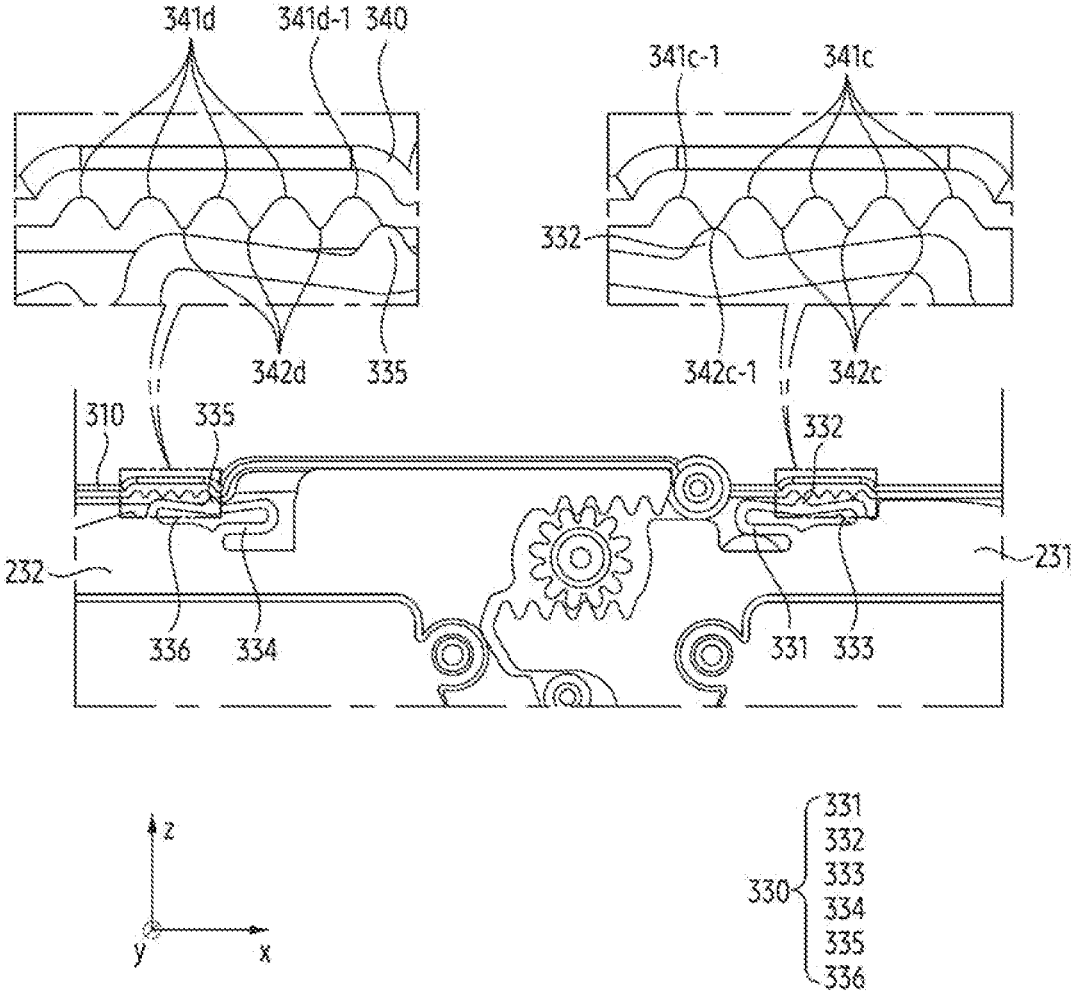
FIG. 12B is a cross-sectional view illustrating a relationship between a first example adjusting structure and a second example adjusting structure when a distance between a first lens and a second lens is a second distance, according to an embodiment.

FIG. 12A is a cross-sectional view illustrating a relationship between a first adjusting structure and a second adjusting structure when a distance between a first lens and a second lens is a first distance, according to an embodiment. FIG. 12B is a cross-sectional view illustrating a relationship between a first adjusting structure and a second adjusting structure when a distance between a first lens and a second lens is a second distance, according to an embodiment.

The first adjusting structure 330 of FIGS. 12A and 12B may be an adjusting structure in which the structure of the first adjusting structure 330 of FIGS. 4A and/or 4B is changed, so redundant descriptions will be omitted.

The second adjusting structure 340 of FIGS. 12A and 12B may be an adjusting structure in which the structure of the second adjusting structure 340 of FIGS. 4A and/or 4B is changed, so redundant descriptions will be omitted.

Referring to FIGS. 12A and 12B, according to an embodiment, the first adjusting structure 330 may be coupled to the first lens support 231 and the second lens support 232. For example, the first flange part 331, the first protruding part 332, and the first opening 333 of the first adjusting structure 330 may be coupled to the first lens support 231. The second flange part 334, the second protruding part 335, and the second opening 336 of the first adjusting structure 330 may be coupled to the second lens support 232. The first flange part 331, the first protruding part 332, and the first opening 333 may be movable together with the first lens support 231. For example, the first flange part 331, the first protruding part 332, and the first opening 333 may be movable together with the first lens support 231, independently of the second lens support 232, by being coupled to the first lens support 231 movable independently of the second lens support 232. The second flange part 334, the second protruding part 335, and the second opening 336 may be movable together with the second lens support 232. For example, the second flange part 334, the second protruding part 335, and the second opening 336 may be movable together with the second lens support 232, independently of the first lens support 231, by being coupled to the second lens support 232 movable independently of the first lens support 231.

According to an embodiment, the second adjusting structure 340 may be disposed on the supporting member 310. The second adjusting structure 340 may be formed (or defined) in the supporting member 310. For example, as shown in FIG. 12A, the second adjusting structure 340 may include a plurality of third grooves 341$c$, a plurality of fourth grooves 341$d$, a plurality of third protrusions 342$c$, and a plurality of fourth protrusions 342$d$.

According to an embodiment, the plurality of third grooves 341$c$ may be arranged with respect to the first protruding part 332. For example, the plurality of third grooves 341$c$ may be arranged to be spaced apart from each other along a first direction (e.g., +x direction) or a second direction (e.g., −x direction). For example, the plurality of third grooves 341$c$ may face the first protruding part 332.

According to an embodiment, the plurality of fourth grooves 341$d$ may be arranged with respect to the second protruding part 335. For example, the plurality of fourth grooves 341$d$ may be arranged to be spaced apart from each other along the first direction (e.g., +x direction) or the second direction (e.g., −x direction). For example, the plurality of fourth grooves 341$d$ may face the second protruding part 335. According to an embodiment, the plurality of fourth grooves 341$d$ may be spaced apart from the plurality of third grooves 341$c$. For example, the plurality of fourth grooves 341$d$ may be spaced apart from the plurality of third grooves 341$c$ along the second direction (e.g., −x direction). For example, a part of the supporting member 310 in which the plurality of fourth grooves 341$d$ are formed may be spaced apart from another part of the supporting member 310 in which the plurality of third grooves 341$c$ are formed along the second direction (e.g., −x direction).

According to an embodiment, the plurality of third protrusions 342$c$ may be disposed between the plurality of third grooves 341$c$. The plurality of third protrusions 342$c$ may be arranged with respect to the first protruding part 332. The plurality of third protrusions 342$c$ may be spaced apart from each other. For example, the plurality of third protrusions 342$c$ may be arranged to be spaced apart from each other along the first direction (e.g., +x direction) or the second direction (e.g., −x direction).

According to an embodiment, the plurality of fourth protrusions 342$d$ may be disposed between the plurality of fourth grooves 341$d$. The plurality of fourth protrusions 342$d$ may be arranged with respect to the second protruding part 335. The plurality of fourth protrusions 342$d$ may be spaced apart from each other. For example, the plurality of fourth protrusions 342$d$ may be arranged to be spaced apart from each other in the first direction (e.g., +x direction) or the second direction (e.g., −x direction).

Referring to FIG. 12A, according to an embodiment, when a distance between a first lens (e.g., the first lens 231$a$ of FIG. 2B) and a second lens (e.g., the second lens 232$a$ of FIG. 2B) is a first distance (e.g., the first distance d1 of FIG. 4A), the first protruding part 332 may be positioned (or accommodated) inside the groove 341$c$-1 among the plurality of third grooves 341$c$. For example, when the distance between the first lens 231$a$ and the second lens 232$a$ is the first distance d1, the first protruding part 332 may be engaged with (any one of) the plurality of third protrusions 342$c$.

According to an embodiment, when the distance between the first lens 231$a$ and the second lens 232$a$ is the first distance d1, the second protruding part 335 may be positioned outside the plurality of fourth grooves 341$d$. For example, when the distance between the first lens 231$a$ and the second lens 232$a$ is the first distance d1, the second protruding part 335 may be positioned outside the plurality of fourth grooves 341$d$ by a contact with the second adjusting structure 340 (or the supporting member 310). When the distance between the first lens 231$a$ and the second lens 232$a$ is the first distance d1, the engagement between the second protruding part 335 and (any one of) the plurality of fourth protrusions 342$d$ may be released.

According to an embodiment, as the first lens support 231 moves with respect to the second lens support 232 in the first direction (e.g., +x direction), the distance between the first lens 231$a$ and the second lens 232$a$ may be changed from the first distance d1 to a second distance (e.g., the second distance d2 of FIG. 4B).

Referring to FIG. 12B, according to an embodiment, when the distance between the first lens 231$a$ and the second lens 232$a$ is the second distance d2, the first protruding part 332 may be positioned outside the plurality of third grooves 341$c$. For example, when the distance between the first lens 231$a$ and the second lens 232$a$ is the second distance d2, the first protruding part 332 may be positioned outside the plurality of third grooves 341$c$ by contacting with a protrusion 342$c$-1 of the plurality of third protrusions 342$c$. For example, when the distance between the first lens 231$a$ and the second lens 232$a$ is the second distance d2, the engagement between the first protruding part 332 and the plurality of third protrusions 342$c$ may be released.

According to an embodiment, when the distance between the first lens 231$a$ and the second lens 232$a$ is the second distance d2, the second protruding part 335 may be positioned outside the plurality of fourth grooves 341$d$. For example, since the second protruding part 335 and the first protruding part 332 may move independently from each other, a relationship between the second protruding part 335 and the plurality of fourth grooves 341$d$ (when the distance between the first lens 231$a$ and the second lens 232$a$ is the second distance d2) may be substantially the same as a relationship between the second protruding part 335 and the plurality of fourth grooves 341$d$ (when the distance between the first lens 231$a$ and the second lens 232$a$ is the first distance d1).

According to an embodiment, as the second lens support 232 moves with respect to the first lens support 231 in a second direction (e.g., −x direction), the distance between the first lens 231$a$ and the second lens 232$a$ may be changed from the second distance d2 to a third distance that is different from the first distance d1 or the second distance d2. When the distance between the first lens 231$a$ and the second lens 232$a$ is the third distance, the second protruding part 335 may be positioned (or accommodated) inside the groove 341$d$-1 among the plurality of fourth grooves 341$d$. A relationship between the first protruding part 332 and the plurality of third grooves 341$c$ (when the distance between the first lens 231$a$ and the second lens 232$a$ is the third distance) may be substantially the same as a relationship between the first protruding part 332 and the plurality of third grooves 341$c$ (when the distance between the first lens 231$a$ and the second lens 232$a$ is the second distance d2).

As described above, according to an embodiment, since the first protruding part 332 (which is movable with respect to the plurality of third grooves 341$c$) is movable independently of the second protruding part 335 (which is movable with respect to the plurality of fourth grooves 341$d$), the electronic device 101 may provide a structure in which the distance between the first lens 231a and the second lens 232a may be precisely adjusted.

Figure 13A:
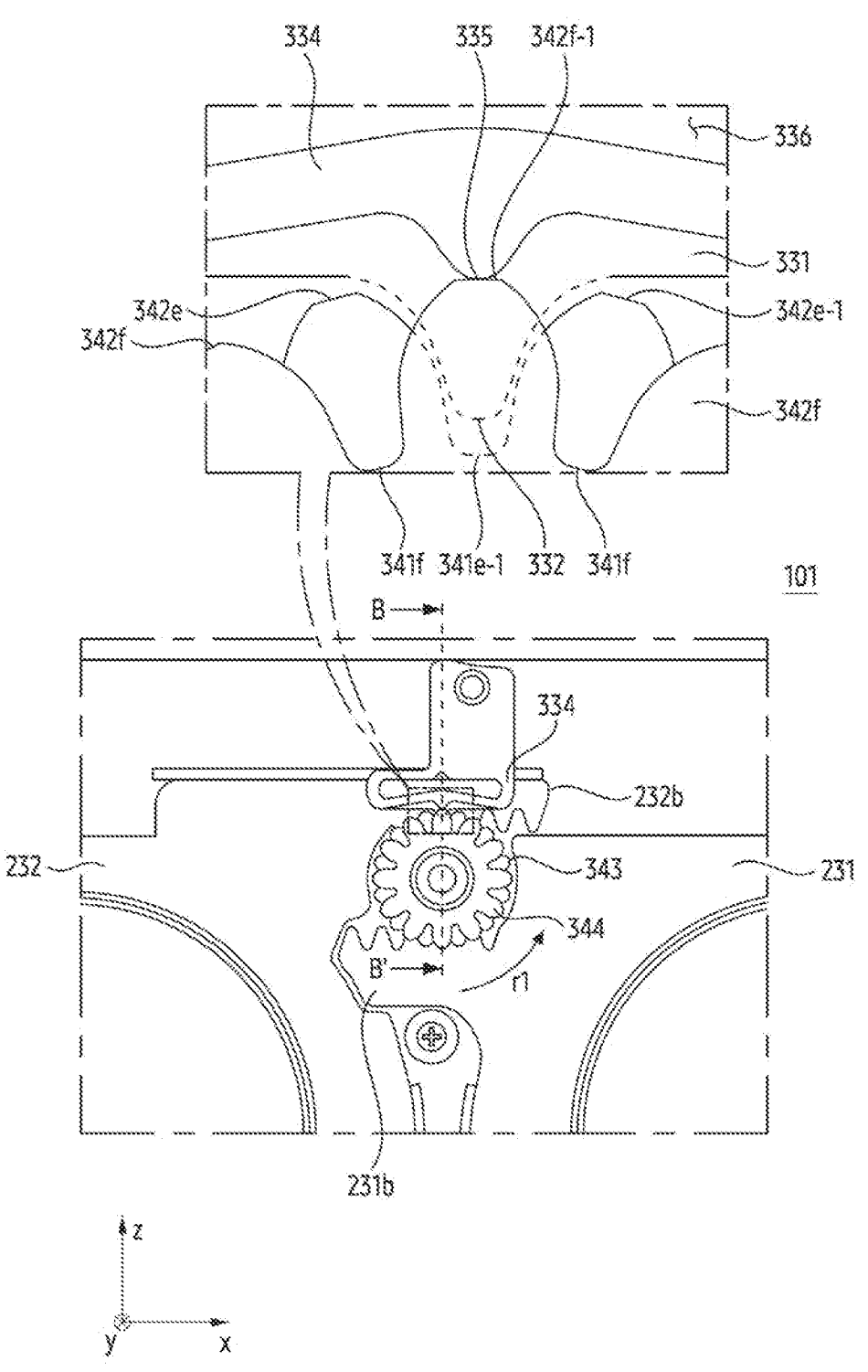
FIG. 13A is a top plan view illustrating a first example adjusting structure and a second example adjusting structure when a distance between a first lens and a second lens is a first distance, according to an embodiment.
Figure 13B:
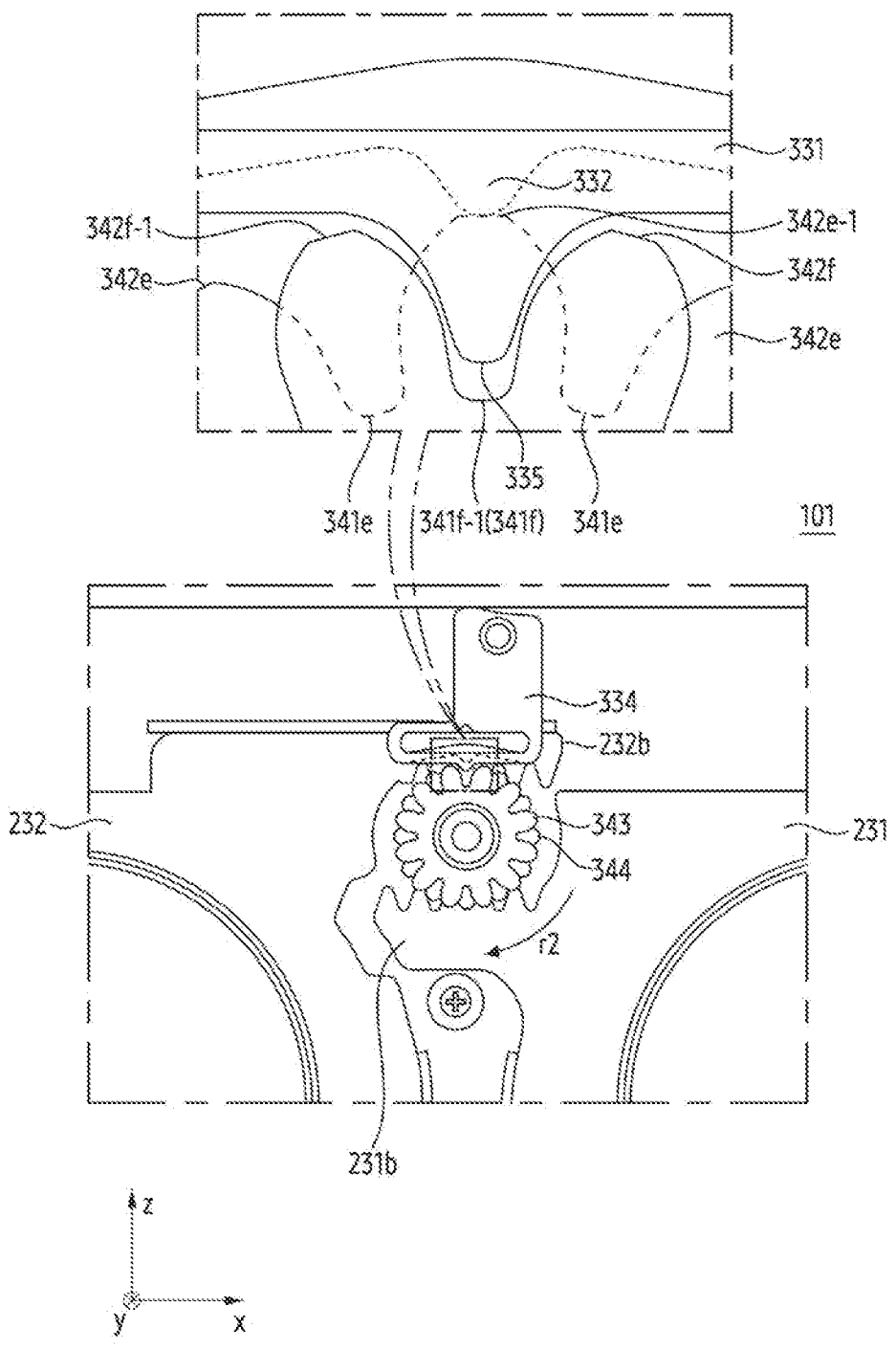
FIG. 13B is a top plan view illustrating a first example adjusting structure and a second example adjusting structure when a distance between a first lens and a second lens is a second distance, according to an embodiment.
Figure 13C:
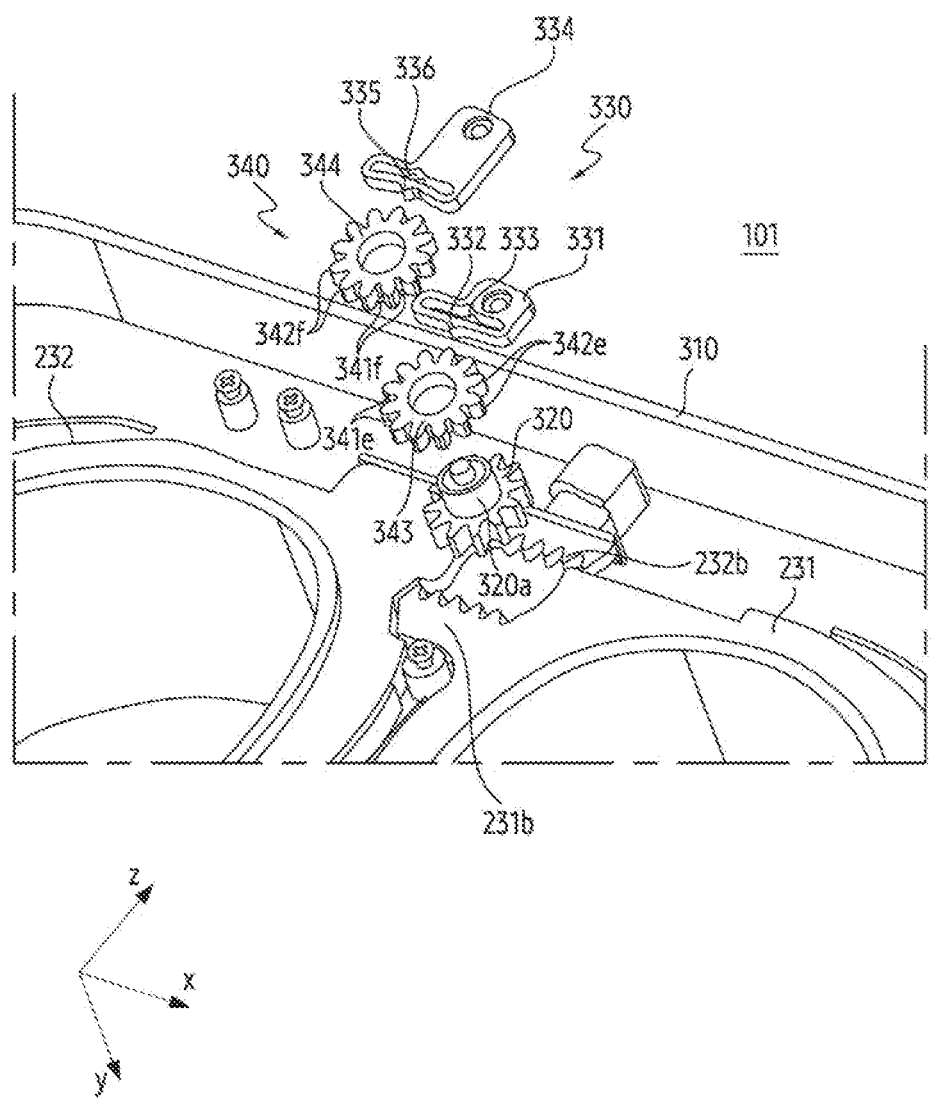
FIG. 13C is an exploded perspective view of a first example adjusting structure and a second example adjusting structure, according to an embodiment.
Figure 13D:
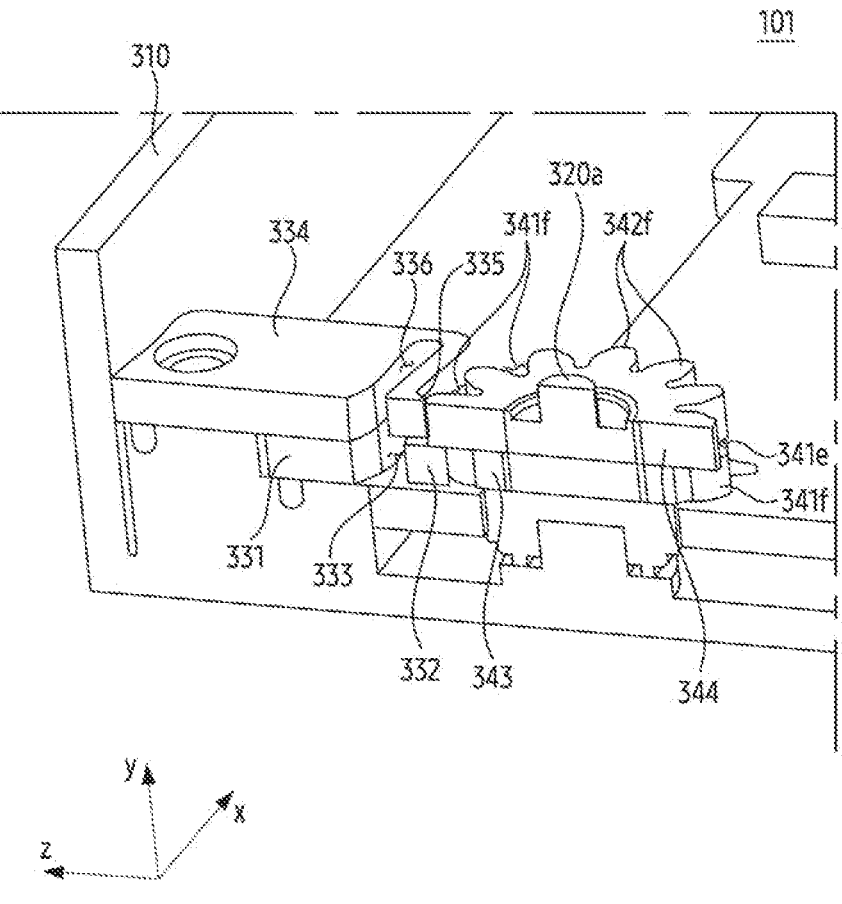
FIG. 13D is a cross-sectional view illustrating an example in which an example electronic device is cut along line B-B' of FIG. 13A, according to an embodiment.

FIG. 13A is a top plan view illustrating a first adjusting structure and a second adjusting structure when a distance between a first lens and a second lens is a first distance, according to an embodiment. FIG. 13B is a top plan view illustrating a first adjusting structure and a second adjusting structure when a distance between a first lens and a second lens is a second distance, according to an embodiment. FIG. 13C is an exploded perspective view of a first adjusting structure and a second adjusting structure, according to an embodiment. FIG. 13D is a cross-sectional view illustrating an example in which an example electronic device is cut along line B-B' of FIG. 13A, according to an embodiment.

The first adjusting structure 330 of FIGS. 13A, 13B, 13C, and 13D may be an adjusting structure in which the structure of the first adjusting structure 330 of FIGS. 4A and/or 4B is changed, so redundant descriptions will be omitted.

The second adjusting structure 340 of FIGS. 13A, 13B, 13C, and 13D may be an adjusting structure in which the structure of the second adjusting structure 340 of FIGS. 4A and/or 4B is changed, so redundant descriptions will be omitted.

Referring to FIGS. 13A, 13B, 13C, and 13D, according to an embodiment, the first flange part 331, the first protruding part 332, and the first opening 333 of the first adjusting structure 330 may be disposed on a supporting member 310. The first flange part 331, the first protruding part 332, and the first opening 333 may be fastened to the supporting member 310. For example, positions of each of the first flange part 331, the first protruding part 332, and the first opening 333 with respect to the supporting member 310 may be maintained when the first lens support 231 and the second lens support 232 move with respect to the supporting member 310. The first flange part 331 may be disposed on at least one of the first rack gear 231b and the second rack gear 232b. For example, the first flange part 331 may be disposed on the second rack gear 232b, but the first flange part 331 is not limited thereto. For example, the first flange part 331 may also be disposed on the first rack gear 231b.

According to an embodiment, the second flange part 334, the second protruding part 335, and the second opening 336 of the first adjusting structure 330 may be disposed on the supporting member 310. The second flange part 334, the second protruding part 335, and the second opening 336 may be fastened to the supporting member 310. For example, positions of each of the second flange part 334, the second protruding part 335, and the second opening 336 with respect to the supporting member 310 may be maintained when the first lens support 231 and the second lens support 232 move with respect to the supporting member 310. The second flange part 334 may be disposed on the first flange part 331. For example, the first flange part 331 may be disposed (or interposed) between the second rack gear 232b and the second flange part 334. The second protruding part 335 may be stacked on the first protruding part 332 to be misaligned with the first protruding part 332.

According to an embodiment, the second adjusting structure 340 may include a plurality of fifth grooves 341e, a plurality of sixth grooves 341f, a plurality of fifth protrusions 342e, a plurality of sixth protrusions 342f, a first adjusting member 343, and/or a second adjusting member 344.

According to an embodiment, the plurality of fifth grooves 341e may be arranged with respect to the first protruding part 332. For example, the plurality of fifth grooves 341e may be arranged to be spaced apart from each other along a rotational direction (e.g., the first rotation direction r1 in FIG. 4A and/or the second rotation direction r2 in FIG. 4B) of a pinion gear 320. For example, the plurality of fifth grooves 341e may be arranged to be spaced apart from each other along a circumferential direction of the pinion gear 320.

According to an embodiment, the plurality of sixth grooves 341f may be arranged with respect to the second protruding part 335. For example, the plurality of sixth grooves 341f may be arranged to be spaced apart along the rotation direction (e.g., the first rotation direction r1 in FIG. 4A and/or the second rotation direction r2 in FIG. 4B) of the pinion gear 320. For example, the plurality of sixth grooves 341f may be arranged to be spaced apart along the circumferential direction of the pinion gear 320. Each of the plurality of sixth grooves 341f may be misaligned with each of the plurality of fifth grooves 341e.

According to an embodiment, the plurality of fifth protrusions 342e may be arranged with respect to the first protruding part 332. The plurality of fifth protrusions 342e may be arranged to be spaced apart along the rotation direction (e.g., the first rotation direction r1 in FIG. 4A or the second rotation direction r2 in FIG. 4B) of the pinion gear 320. For example, the plurality of fifth protrusions 342e may be arranged to be spaced apart along the circumferential direction of the pinion gear 320. The plurality of fifth protrusions 342e may be disposed between the plurality of fifth grooves 341e.

According to an embodiment, the plurality of sixth protrusions 342f may be arranged with respect to the second protruding part 335. The plurality of sixth protrusions 342f may be arranged to be spaced apart from each other along the rotation direction (e.g., the first rotation direction r1 in FIG. 4A or the second rotation direction r2 in FIG. 4B) of the pinion gear 320. For example, the plurality of sixth protrusions 342f may be arranged to be spaced apart along the circumferential direction of the pinion gear 320. The plurality of sixth protrusions 342f may be disposed between the plurality of sixth grooves 341f. Each of the plurality of sixth protrusions 342f may be misaligned with each of the plurality of fifth protrusions 342e. For example, when the supporting member 310 is viewed from above, each of the plurality of sixth protrusions 342f may be disposed between the plurality of fifth protrusions 342e. For example, when the supporting member 310 is viewed from above, each of the plurality of sixth protrusions 342f may overlap with the plurality of fifth grooves 341e.

According to an embodiment, the first adjusting member 343 may include the plurality of fifth grooves 341e and the plurality of fifth protrusions 342e. For example, the plurality of fifth grooves 341e and the plurality of fifth protrusions 342e may be disposed on the first adjusting member 343. For example, the plurality of fifth grooves 341e and the plurality of fifth protrusions 342e may be formed on the first adjusting member 343. The first adjusting member 343 may be disposed on the pinion gear 320. The first adjusting member 343 may be rotatable with the pinion gear 320 by rotation of the pinion gear 320. The first adjusting member 343 may not be engaged with the first rack gear 231b and the second rack gear 232b. For example, a rotation direction of the first adjusting member 343 may be substantially the same as a rotation direction of the pinion gear 320. For example, the first adjusting member 343 may be coupled to a rotation shaft 320a of the pinion gear 320. For example, the rotation shaft 320a of the pinion gear 320 may penetrate the first adjusting member 343.

According to an embodiment, the second adjusting member 344 may include the plurality of sixth grooves 341f and the plurality of sixth protrusions 342*f*. For example, the plurality of sixth grooves 341*f* and the plurality of sixth protrusions 342*f* may be disposed in the second adjusting member 344. The plurality of sixth grooves 341*f* and the plurality of sixth protrusions 342*f* may be formed in the second adjusting member 344. The second adjusting member 344 may be disposed on the pinion gear 320. The second adjusting member 344 may be rotatable with the pinion gear 320 by rotation of the pinion gear 320. The second adjusting member 344 may not be engaged with the first rack gear 231*b* and the second rack gear 232*b*. For example, a rotation direction of the second adjusting member 344 may be substantially the same as the rotation direction of the pinion gear 320. For example, the second adjusting member 344 may be coupled to the rotation shaft 320*a* of the pinion gear 320. For example, the rotation shaft 320*a* of the pinion gear 320 may penetrate the second adjusting member 344. The second adjusting member 344 may be stacked on the first adjusting member 343. For example, the first adjusting member 343 may be disposed (or interposed) between the second adjusting member 344 and the pinion gear 320.

Referring to FIG. 13A, according to an embodiment, when a distance between a first lens (e.g., the first lens 231*a* of FIG. 2B) and a second lens (e.g., the second lens 232*a* of FIG. 2B) is a first distance (e.g., the first distance d1 of FIG. 4A), the first protruding part 332 may be positioned (or accommodated) inside a groove 341*e*-1 among the plurality of fifth grooves 341*e*. When the distance between the first lens 231*a* and the second lens 232*a* is the first distance d1, the first protruding part 332 may be positioned between the plurality of fifth protrusions 342*e*. For example, when the distance between the first lens 231*a* and the second lens 232*a* is the first distance d1, the first protruding part 332 may be engaged with the plurality of fifth protrusions 342*e*.

According to an embodiment, when the distance between the first lens 231*a* and the second lens 232*a* is the first distance d1, the second protruding part 335 may be positioned outside the plurality of sixth grooves 341*f*. For example, when the distance between the first lens 231*a* and the second lens 232*a* is the first distance d1, as the second flange part 334 is deformed by a contact between a protrusion 342*f*-1 among the plurality of sixth protrusions 342*f* and the second protruding part 335, the second protruding part 335 may be positioned outside the plurality of sixth grooves 341*f*. For example, when the distance between the first lens 231*a* and the second lens 232*a* is the first distance d1, the engagement between the plurality of sixth protrusions 342*f* and the second protruding part 335 may be released.

According to an embodiment, the pinion gear 320 may rotate along the first rotation direction r1 by a movement of the first lens support 231 with respect to the second lens support 232 in the first direction (e.g., +x direction). The first adjusting member 343 and the second adjusting member 344 may rotate along the first rotational direction r1, by a rotation of the pinion gear 320 in the first rotation direction r1. As the pinion gear 320 rotates in the first rotational direction r1, the distance between the first lens 231*a* and the second lens 232*a* may be changed from the first distance d1 to the second distance d2.

Referring to FIG. 13B, according to an embodiment, when the distance between the first lens 231*a* and the second lens 232*a* is the second distance d2, the first protruding part 332 may be positioned outside the plurality of fifth grooves 341*e*. For example, when the distance between the first lens 231*a* and the second lens 232*a* is the second distance d2, as the first flange part 331 is deformed by a contact between a protrusion 342*e*-1 among the plurality of fifth protrusions 342*e* and the first protruding part 332, the first protruding part 332 may be positioned outside the plurality of fifth grooves 341*e*. For example, when the distance between the first lens 231*a* and the second lens 232*a* is the second distance d2, the engagement between the first protruding part 332 and (any one of) the plurality of fifth protrusions 342*e* may be released.

According to an embodiment, when the distance between the first lens 231*a* and the second lens 232*a* is the second distance d2, the second protruding part 335 may be positioned (or accommodated) inside a groove 341*f*-1 among the plurality of sixth grooves 341*f*. When the distance between the first lens 231*a* and the second lens 232*a* is the second distance d2, the second protruding part 335 may be positioned between the plurality of sixth protrusions 342*f*. For example, when the distance between the first lens 231*a* and the second lens 232*a* is the second distance d2, the second protruding part 335 may be engaged with the plurality of sixth protrusions 342*f*.

According to an embodiment, as the first lens support 231 moves in the second direction (e.g., −x direction) with respect to the second lens support 232, the pinion gear 320 may rotate in the second rotation direction r2. The first adjusting member 343 and the second adjusting member 344 may rotate along the second rotation direction r2, by the rotation of the pinion gear 320 in the second rotation direction r2. As the pinion gear 320 rotates in the second rotation direction r2, the distance between the first lens 231*a* and the second lens 232*a* may be changed from the second distance d2 to the first distance d1.

As described above, according to an embodiment, as a relative position of the first protruding part 332 and the second protruding part 335 with respect to the plurality of grooves 341*e* and 341*f* that rotate according to a rotation of the pinion gear 320 when the pinion gear 320 rotates are changed, the electronic device 101 may provide a structure in which a distance between the first lens 231*a* and the second lens 232*a* may be precisely changed.

The electronic device may include a plurality of lenses to provide various visual content. The electronic device may include a structure in which a distance between the plurality of lenses may be adjusted to correspond to an inter pupillary distance of a user. Since the user's inter pupillary distance may vary for each user, the electronic device may require a structure capable of precisely adjusting the user's inter pupillary distance.

An electronic device (e.g., the electronic device 101 of FIGS. 2A, 2B, and 2C) is provided. According to an embodiment, the electronic device may comprise a first lens support (e.g., the first lens support 231 of FIG. 2B) coupled to a first lens (e.g., the first lens 231*a* of FIG. 2B). According to an embodiment, the electronic device may comprise a second lens support (e.g., the second lens support 232 of FIG. 2B) movable with respect to the first lens support and coupled to a second lens (e.g., the second lens 232*a* of FIG. 2B). According to an embodiment, the electronic device may comprise a first adjusting structure (e.g., the first adjusting structure 330 of FIG. 5A and FIG. 5B) for adjusting a distance between the first lens and the second lens, including a first protruding part (e.g., the first protruding part 332 of FIG. 5A and FIG. 5B) and a second protruding part (e.g., the second protruding part 335 of FIG. 5A and FIG. 5B) disposed on the first protruding part. According to an embodiment, the electronic device may comprise a second adjusting structure (e.g., the second adjusting structure 340 of FIG. 6A and FIG. 6B) including a plurality of grooves (e.g., the plurality of grooves 341 of FIG. 6A and FIG. 6B)

spaced apart from each other and arranged with respect to the first protruding part and the second protruding part, and a plurality of protrusions (e.g., the plurality of protrusions 342 of FIG. 6A and FIG. 6B) disposed between the plurality of grooves. According to an embodiment, when the distance between the first lens and the second lens is a first distance (e.g., the first distance d1 of FIG. 4A), the first protruding part may maintain the first distance by engaging with the plurality of protrusions, and the second protruding part may be positioned outside of the plurality of grooves. According to an embodiment, when the distance between the first lens and the second lens is a second distance (e.g., the second distance d2 of FIG. 4B) different from the first distance, the first protruding part may be positioned outside of the plurality of grooves, and the second protruding part may maintain the second distance by engaging with the plurality of protrusions.

According to an embodiment, since the protruding part is positioned outside or inside the plurality of grooves as the distance between the first lens and the second lens is changed, the electronic device may provide a structure in which a distance between the first lens and the second lens may be precisely adjusted.

According to an embodiment, the first adjusting structure may include a second flange part (e.g., the second flange part 334 of FIG. 5A and FIG. 5B) to be stacked on the first flange part. According to an embodiment, the first adjusting structure may include a second protruding part (e.g., the second protruding part 335 of FIG. 5A and FIG. 5B) to be stacked on the first protruding part. According to an embodiment, the plurality of grooves may include a plurality of first grooves. According to an embodiment, the plurality of grooves may include a plurality of second grooves (e.g., the plurality of second grooves 341*b* of FIG. 6A and FIG. 6B) disposed on the plurality of first grooves (e.g., the plurality of first grooves 341*a* of FIG. 6A and FIG. 6B) and respectively misaligned with each of the plurality of first grooves. According to an embodiment, the plurality of protrusions may include a plurality of first protrusions (e.g., the plurality of first protrusions 342*a* of FIG. 6*a* and FIG. 6*b*) disposed between the plurality of first grooves. According to an embodiment, the plurality of protrusions may include a plurality of second protrusions (e.g., the plurality of first protrusions 342*a* of FIG. 6A and FIG. 6B)) stacked on the plurality of first protrusions and respectively misaligned with each of the plurality of first protrusions. According to an embodiment, when the distance is the first distance, the first protruding part may be positioned inside of a groove of the plurality of first grooves, and the second protruding part may be positioned outside of the plurality of second grooves by being in contact with a protrusion of the plurality of second protrusions. According to an embodiment, when the distance is the second distance, the first protruding part may be positioned outside of the plurality of first grooves by being in contact with a protrusion of the plurality of first protrusions, and the second protruding part may be positioned inside of a groove of the plurality of second grooves.

According to an embodiment, as the plurality of first grooves and the plurality of second grooves are misaligned with each other, the electronic device may provide a structure in which the distance between the first lens and the second lens may be precisely adjusted.

According to an embodiment, each of the plurality of first grooves may overlap with each of the plurality of second protrusions. According to an embodiment, each of the plurality of second grooves may overlap with each of the plurality of first protrusions.

According to an embodiment, since the plurality of first grooves and the plurality of second grooves are misaligned with each other, the electronic device may provide a structure in which the distance between the first lens and the second lens may be precisely adjusted.

According to an embodiment, the second protruding part may be aligned with the first protruding part to overlap with the first protruding part.

According to an embodiment, since the first protruding part and the second protruding part are aligned with each other, and the plurality of first grooves and the plurality of second grooves are misaligned with each other, the electronic device may provide a structure in which the distance between the first lens and the second lens may be precisely adjusted.

According to an embodiment, the second protruding part may be disposed on the first protruding part to be misaligned with the first protruding part.

According to an embodiment, since the first protruding part and the second protruding part are misaligned with, and the plurality of first grooves and the plurality of second grooves are misaligned with each other, the electronic device may provide a structure in which the distance between the first lens and the second lens may be precisely adjusted.

According to an embodiment, the first adjusting structure may further include a first flange part (e.g., the first flange part 331 of FIG. 5A and FIG. 5B) connected to the first protruding part. According to an embodiment, the first flange part may be deformed in a direction away from the plurality of grooves by being in contact with a protrusion of the plurality of protrusions.

According to an embodiment, the first protruding part is moved outside or inside the plurality of grooves as the distance between the first lens and the second lens is changed, the electronic device may provide a structure in which the distance between the first lens and the second lens may be precisely adjusted.

According to an embodiment, the first adjusting structure may further include an opening (e.g., the first opening 333 of FIG. 5A and FIG. 5B) surrounded by the first flange part by penetrating the first flange part.

According to an embodiment, the electronic device may provide a structure in which a distance between the first lens and the second lens may be precisely adjusted by the first flange part including an opening deformable according to a change in the distance between the first lens and the second lens.

According to an embodiment, a shape of the opening may be deformed when the first protruding part is in contact with at least one of the plurality of protrusions.

According to an embodiment, the first adjusting structure may further include a first flange part (e.g., the first flange part 331 of FIG. 5A and FIG. 5B) connected to the first protruding part. According to an embodiment, the first adjusting structure may include a second flange part (e.g., the second flange part 334 of FIG. 5A and FIG. 5B) disposed on the first flange part and connected to the second protruding part. According to an embodiment, the first adjusting structure may include a second protruding part (e.g., the second protruding part 335 of FIG. 5A and FIG. 5B) protruding from the second flange part. According to an embodiment, the first adjusting structure may include a fastening member (e.g., the fastening member f1 of FIG. 5A and FIG. 5B) coupling the second flange part to the first lens support by penetrating the first lens support and the second flange part.

According to an embodiment, the first lens support may include at least one guide hole (e.g., the guide hole 231c of FIG. 5A and FIG. 5B) penetrating the first lens support. According to an embodiment, the second flange part may include a guide protrusion (e.g., the guide protrusion 334a of FIG. 5A and FIG. 5B) inserted into the guide hole.

According to an embodiment, the electronic device may provide a structure in which the second flange part and the first lens support are easily coupled by the guide hole and the guide protrusion.

According to an embodiment, the plurality of protrusion and the plurality of grooves may be arranged to be spaced apart from each other along a moving direction of the first lens support with respect to the second lens support.

According to an embodiment, the electronic device may provide a structure in which the distance between the first lens and the second lens may be precisely adjusted by the plurality of protrusion and the plurality of grooves arranged to be spaced apart from each other.

According to an embodiment, the electronic device may further include a supporting member (e.g., the supporting member 310 of FIGS. 4A and 4B) coupled to the second adjusting structure. According to an embodiment, the first adjusting structure may be coupled to at least one of the first lens support and the second lens support.

According to an embodiment, the first flange part and the first protruding part may be movable with respect to the supporting member together with the first lens support, by being coupled to the first lens support. According to an embodiment, the first adjusting structure may include a second flange part, which is movable with respect to the supporting member together with the second lens support by being coupled to the second lens support independently of the first lens support, and a second protruding part protruding from the second flange part. According to an embodiment, the plurality of grooves may include a plurality of third grooves (e.g., the plurality of third grooves 341c of FIG. 12A and FIG. 12B) arranged with respect to the first protruding part, and a plurality of fourth grooves (e.g., the plurality of third grooves 341c of FIG. 12A and FIG. 12B) spaced apart from the plurality of third grooves to be arranged with respect to the second protruding part. According to an embodiment, the plurality of protrusions may include a plurality of third protrusions (e.g., the plurality of third protrusions 342c of FIG. 12A and FIG. 12B) disposed between the plurality of third grooves, and a plurality of fourth protrusions (e.g., the plurality of fourth protrusions 342d of FIG. 12A and FIG. 12B) disposed between the plurality of fourth grooves by being spaced apart from the plurality of third protrusions. According to an embodiment, when the distance is the first distance, the first protruding part may be positioned inside a groove of the plurality of third grooves, and the second protruding part may be positioned outside the plurality of fourth grooves. According to an embodiment, when the distance is the second distance, the first protruding part may be positioned outside the plurality of third grooves by being in contact with a protrusion of the plurality of third protrusions, and the second protruding part may be positioned outside the plurality of fourth grooves.

According to an embodiment, the electronic device may provide a structure in which the distance between the first lens and the second lens may be precisely adjusted by the first protruding part and the second protruding part, which are independently movable with respect to each other.

According to an embodiment, the electronic device may further include a pinion gear (e.g., the pinion gear 320 of FIG. 4A and FIG. 4B) disposed between the first lens support and the second lens support. According to an embodiment, the first lens support may include a first rack gear (e.g., the first rack gear 231b of FIG. 4A and FIG. 4B) engaged with the pinion gear. According to an embodiment, the second lens support may include a second rack gear (e.g., the second rack gear 232b of FIG. 4A and FIG. 4B) engaged with the pinion gear and spaced apart from the first rack gear. According to an embodiment, the pinion gear may rotates along a first rotational direction when the distance is changed from the first distance to the second distance, by a movement of the first rack gear with respect to the second rack gear. According to an embodiment, the pinion gear may rotate along a second rotational direction opposite to the first rotational direction when the distance is changed from the second distance to the first distance, by a movement of the first rack gear with respect to the second rack gear.

According to an embodiment, the electronic device may provide a structure in which the distance between the first lens and the second lens may be precisely adjusted by the pinion gear rotating by the movement of the first rack gear and the second rack gear.

According to an embodiment, the first adjusting structure may be disposed on one of the first rack gear and the second rack gear. According to an embodiment, the plurality of grooves and the plurality of protrusions may be spaced apart from each other along a rotational direction of the pinion gear and are disposed on the pinion gear.

According to an embodiment, the electronic device may provide a structure in which the distance between the first lens and the second lens may be precisely adjusted by a plurality of grooves and a plurality of protrusions stacked on the pinion gear.

According to an embodiment, the first adjusting structure may further include a second flange part to be stacked on the first flange part, and a second protruding part, which is protruding from the second flange part and stacked on the first protruding part for being aligned with the first protruding part. According to an embodiment, the plurality of grooves may include a plurality of fifth grooves (e.g., the plurality of fifth grooves 341e of FIG. 13A and FIG. 13B), and a plurality of sixth grooves (e.g., the plurality of sixth grooves 341f of FIG. 13A and FIG. 13B) disposed on the plurality of fifth grooves to be misaligned with the plurality of fifth grooves. According to an embodiment, the plurality of protrusions may include a plurality of fifth protrusions (e.g., the plurality of fifth protrusions 342e of FIG. 13A and FIG. 13B), and a plurality of sixth protrusions (e.g., the plurality of sixth protrusions 342f of FIG. 13A and FIG. 13B) disposed on the plurality of fifth protrusions to be misaligned with the plurality of fifth protrusions. According to an embodiment, when the distance is the first distance, the first protruding part may be positioned inside of a groove of the plurality of fifth grooves and the second protruding part may be positioned outside of the plurality of sixth grooves by being in contact with a protrusion of the plurality of sixth protrusions. According to an embodiment, when the distance is the second distance, the first protruding part may be positioned outside of the plurality of fifth grooves by being in contact with a protrusion of the plurality of fifth protrusions, and the second protruding part may be positioned inside of a groove of the plurality of sixth grooves.

According to an embodiment, the electronic device may provide a structure in which the distance between the first lens and the second lens may be precisely adjusted by the plurality of grooves and the plurality of protrusions, which are stacked to be misaligned on the pinion gear.

A wearable device (e.g., the wearable device 101 of FIGS. 2A, 2B, and 2C) is provided. According to an embodiment, the wearable device may comprise a first lens support (e.g., the first lens support 231 of FIG. 2B) coupled to a first lens (e.g., the first lens 231a of FIG. 2B). According to an embodiment, the wearable device may comprise a second lens support (e.g., the second lens support 232 of FIG. 2B) movable with respect to the first lens support and coupled to a second lens (e.g., the second lens 232a of FIG. 2B). According to an embodiment, the wearable device may comprise a first adjusting structure (e.g., the first adjusting structure 330 of FIG. 5A and FIG. 5B) coupled to the first lens support and including a first flange part (e.g., the first flange part 331 of FIG. 5A and FIG. 5B), a first protruding part (e.g., the first protruding part 332 of FIG. 5A and FIG. 5B) protruding from the first flange part and an opening (e.g., the opening 333 of FIG. 5A and FIG. 5B) surrounded by the first flange part by penetrating the first flange part. According to an embodiment, the wearable device may comprise a second adjusting structure (e.g., the second adjusting structure 340 of FIG. 6A and FIG. 6B) configured to guide a movement of the first lens support with respect to the second lens support and including a plurality of grooves (e.g., the plurality of grooves 341 of FIG. 6A and FIG. 6B) arranged to be spaced apart from each other and a plurality of protrusions (e.g., the plurality of protrusions 342 of FIG. 6A and FIG. 6B) disposed between the plurality of grooves. According to an embodiment, when a distance between the first lens and the second lens is a first distance (e.g., the first distance d1 of FIG. 4A), the first protruding part may be positioned inside of a groove of the plurality of grooves. According to an embodiment, when the distance is a second distance (e.g., the second distance d2 of FIG. 4B) different from the first distance, the first protruding part may be positioned outside of the plurality of grooves, as a shape of the opening is changed by a contact between the first protruding part and a protrusion of the plurality of protrusions.

According to an embodiment, the wearable device may provide a structure in which since the first protruding part is positioned outside or inside the plurality of grooves as the distance between the first lens and the second lens is changed, the distance between the first lens and the second lens may be precisely adjusted.

According to an embodiment, the first adjusting structure may include a second flange part (e.g., the second flange part 334 of FIG. 5A and FIG. 5B) stacked on the first flange part. According to an embodiment, the first adjusting structure may include a second protruding part (e.g., the second protruding part 335 of FIG. 5A and FIG. 5B) stacked on the first protruding part. According to an embodiment, the plurality of grooves may include a plurality of first grooves. According to an embodiment, the plurality of grooves may include a plurality of second grooves (e.g., the plurality of second grooves 341b of FIG. 6A and FIG. 6B) stacked on the plurality of first grooves (e.g., a plurality of first grooves 341a in FIG. 6A and FIG. 6B) and respectively misaligned with each of the plurality of first grooves. According to an embodiment, the plurality of protrusions may include a plurality of first protrusions (e.g., the plurality of first protrusions 342a of FIG. 6A and FIG. 6B) disposed between the plurality of first grooves. According to an embodiment, the plurality of protrusions may include a plurality of second protrusions (e.g., the plurality of first protrusions 342a of FIG. 6A and FIG. 6B) stacked on the plurality of first protrusions and respectively misaligned with each of the plurality of first protrusions. According to an embodiment, when the distance is the first distance, the first protruding part may be positioned inside of a groove of the plurality of first grooves, and the second protruding part may be positioned outside of the plurality of second grooves by being in contact with a protrusion of the plurality of second protrusions. According to an embodiment, when the distance is the second distance, the first protruding part may be positioned outside of the plurality of first grooves by being in contact with a protrusion of the plurality of first protrusions, and the second protruding part may be positioned inside of a groove of the plurality of second grooves.

According to an embodiment, the wearable device may provide a structure in which the distance between the first lens and the second lens may be precisely adjusted as the plurality of first grooves and the plurality of second grooves are misaligned with each other.

According to an embodiment, the second protruding part may be aligned with the second protruding part to overlap with the first protruding part.

According to an embodiment, the wearable device may provide a structure in which the distance between the first lens and the second lens may be precisely adjusted, since the first protruding part and the second protruding part are aligned with each other, and the plurality of first grooves and the plurality of second grooves are misaligned with each other.

According to an embodiment, the second protruding part may be disposed on the first protruding part to be misaligned with the first protruding part.

According to an embodiment, the wearable device may provide a structure in which the distance between the first lens and the second lens may be precisely adjusted, since the first protruding part and the second protruding part are misaligned with each other, and the plurality of first grooves and the plurality of second grooves are misaligned with each other.

According to an embodiment, when the distance is the second distance, the opening may be compressed by a contact between the first protruding part and the groove of the plurality of grooves.

According to an embodiment, the plurality of protrusion and the plurality of grooves may be arranged to be spaced apart from each other along a moving direction of the first lens support with respect to the second lens support.

According to an embodiment, the wearable device may provide a structure in which the distance between the first lens and the second lens may be precisely adjusted by the plurality of protrusions and the plurality of grooves arranged to be spaced apart from each other.

The electronic device according to one or more embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, embodiments of the electronic devices are not limited to those described above.

One or more embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. A singular form of a noun corresponding to an item may include one or more of the things unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," or "connected with" another element (e.g., a second element), it means that the element may be coupled with the other element directly (e.g., wiredly), wirelessly, or via a third element.

No claim element is to be construed under the provisions of 35 U.S.C. § 112, sixth paragraph, unless the element is expressly recited using the phrase "means for" or "means."

The terms "transmit", "receive", and "communicate" as well as the derivatives thereof encompass both direct and indirect communication. The terms "include" and "comprise", and the derivatives thereof refer to inclusion without limitation. The term "or" is an inclusive term meaning "and/or". The phrase "associated with," as well as derivatives thereof, refer to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "processor" refers to any device, system, or part thereof that controls at least one operation. The functionality associated with any particular processor may be centralized or distributed, whether locally or remotely.

As used in connection with one or more embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

One or more embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between a case in which data is semi-permanently stored in the storage medium and a case in which the data is temporarily stored in the storage medium.

According to an embodiment, a method according to one or more embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one or more embodiments, each component (e.g., a module or a program) of the above-described components may include a single entity or multiple entities, and some of the multiple entities may be separately disposed in different components. According to one or more embodiments, one or more of the above-described components may be omitted, or one or more other components may be added. Alternatively or additionally, a plurality of components (e.g., modules or programs) may be integrated into a single component. In such a case, according to one or more embodiments, the integrated component may still perform one or more functions of each of the plurality of components in the same or similar manner as they are performed by a corresponding one of the plurality of components before the integration. According to one or more embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:

a first lens support coupled to a first lens;

a second lens support configured to move with respect to the first lens support, the second lens support being coupled to a second lens;

a first adjusting structure configured to adjust a distance between the first lens and the second lens, the first adjusting structure comprising a first protruding part and a second protruding part disposed on the first protruding part; and a second adjusting structure comprising:

a plurality of grooves spaced apart from each other and arranged with respect to the first protruding part and the second protruding part, and a plurality of protrusions disposed between the plurality of grooves, wherein, when the distance between the first lens and the second lens is a first distance, the first protruding part is configured to maintain the first distance by engaging with the plurality of protrusions, and the second protruding part is positioned outside of the plurality of grooves, and wherein, when the distance between the first lens and the second lens is a second distance different from the first distance, the first protruding part is positioned outside of the plurality of grooves, and the second protruding part is configured to maintain the second distance by engaging with the plurality of protrusions.

2. The electronic device of claim 1, wherein the plurality of grooves comprise:

a plurality of first grooves; and a plurality of second grooves disposed on the plurality of first grooves, wherein each of the plurality of second grooves is respectively misaligned with each of the plurality of first grooves, wherein the plurality of protrusions comprise:

a plurality of first protrusions disposed between the plurality of first grooves; and a plurality of second protrusions disposed on the plurality of first protrusions, wherein each of the plurality of second protrusions is respectively misaligned with each of the plurality of first protrusions, and wherein, when the distance is the first distance, the first protruding part is positioned inside of a groove of the plurality of first grooves, and the second protruding part is positioned outside of the plurality of second grooves by being in contact with a protrusion of the plurality of second protrusions, and wherein, when the distance is the second distance, the first protruding part is positioned outside of the plurality of first grooves by being in contact with a protrusion of the plurality of first protrusions, and the second protruding part is positioned inside of a groove of the plurality of second grooves.

3. The electronic device of claim 2, wherein each of the plurality of first grooves is overlapped with each of the plurality of second protrusions, and wherein each of the plurality of second grooves is overlapped with each of the plurality of first protrusions.

4. The electronic device of claim 1, wherein the second protruding part is aligned with the first protruding part.

5. The electronic device of claim 1, wherein the second protruding part is misaligned with the first protruding part.

6. The electronic device of claim 1, wherein the first adjusting structure further comprises a first flange part connected to the first protruding part, and wherein the first flange part is deformed in a direction away from the plurality of grooves by being in contact with a protrusion of the plurality of protrusions.

7. The electronic device of claim 6, wherein the first adjusting structure further comprises an opening surrounded by the first flange part by penetrating the first flange part.

8. The electronic device of claim 7, wherein a shape of the opening is deformed when the first protruding part is in contact with at least one of the plurality of protrusions.

9. The electronic device of claim 1, wherein the first adjusting structure further comprises: a first flange part connected to the first protruding part; a second flange part disposed on the first flange part and connected to the second protruding part; and a fastening member coupling the second flange part to the first lens support by penetrating the first lens support and the second flange part.

10. The electronic device of claim 9, wherein the first lens support comprises at least one guide hole penetrating the first lens support, and wherein the second flange part comprises a guide protrusion inserted into the at least one guide hole.

11. The electronic device of claim 1, wherein the plurality of protrusions and the plurality of grooves are arranged to be spaced apart from each other, along a moving direction of the first lens support with respect to the second lens support.

12. The electronic device of claim 1, wherein the electronic device further comprises a supporting member coupled to the second adjusting structure, and wherein the first adjusting structure is coupled to at least one of the first lens support and the second lens support.

13. The electronic device of claim 1, wherein the electronic device further comprises a pinion gear disposed between the first lens support and the second lens support, wherein the first lens support comprises a first rack gear engaged with the pinion gear, wherein the second lens support comprises a second rack gear engaged with the pinion gear and spaced apart from the first rack gear, wherein, when the distance is changed from the first distance to the second distance, the pinion gear is configured to rotate along a first rotational direction by the movement of the first rack gear with respect to the second rack gear, and wherein, when the distance is changed from the second distance to the first distance, the pinion gear is configured to rotate along a second rotational direction opposite to the first rotational direction by a movement of the first rack gear with respect to the second rack gear.

14. The electronic device of claim 13, wherein the first adjusting structure is disposed on one of the first rack gear and the second rack gear, wherein the plurality of grooves and the plurality of protrusions are spaced apart from each other along a rotational direction of the pinion gear, and wherein the plurality of grooves and the plurality of protrusions are disposed on the pinion gear.

15. The electronic device of claim 14, wherein the plurality of grooves comprise:

a plurality of fifth grooves; and a plurality of sixth grooves disposed on the plurality of fifth grooves, the plurality of sixth grooves being misaligned with the plurality of fifth grooves, wherein the plurality of protrusions comprise:

a plurality of fifth protrusions; and a plurality of sixth protrusions disposed on the plurality of fifth protrusions, the plurality of sixth protrusions being misaligned with the plurality of fifth protrusions, and wherein, when the distance is the first distance, the first protruding part is positioned inside of a groove of the plurality of fifth grooves, and the second protruding part is positioned outside of the plurality of sixth grooves by being in contact with a protrusion of the plurality of sixth protrusions, wherein, when the distance is the second distance, the first protruding part is positioned outside of the plurality of fifth grooves by being in contact with a protrusion of the plurality of fifth protrusions, and the second protruding part is positioned inside of a groove of the plurality of sixth grooves.

16. A wearable device comprising:

a first lens support coupled to a first lens;

a second lens support configured to move with respect to the first lens support, the second lens support being coupled to a second lens;

a first adjusting structure coupled to the first lens support, the first adjusting structure comprising:

a first flange part, a first protruding part protruding from the first flange part, and an opening surrounded by the first flange part by penetrating the first flange part, and a second adjusting structure configured to guide a movement of the first lens support with respect to the second lens support, the second adjusting structure comprising:

a plurality of grooves arranged to be spaced apart from each other, and a plurality of protrusions disposed between the plurality of grooves, wherein, when a distance between the first lens and the second lens is a first distance, the first protruding part is positioned inside of a groove of the plurality of grooves, and wherein, when the distance is a second distance different from the first distance, the first protruding part is positioned outside of the plurality of grooves, as a shape of the opening is changed by a contact between the first protruding part and a protrusion of the plurality of protrusions.

17. The wearable device of claim 16, wherein the first adjusting structure further comprises:

a second flange part disposed on the first flange part; and a second protruding part disposed on the first protruding part, wherein the plurality of grooves comprise:

a plurality of first grooves; and a plurality of second grooves disposed on the plurality of first grooves, wherein each of the plurality of grooves is respectively misaligned with each of the plurality of first grooves, wherein the plurality of protrusions comprise:

a plurality of first protrusions disposed between the plurality of first grooves; and a plurality of second protrusions disposed on the plurality of first protrusions, wherein each of the plurality of protrusions is respectively misaligned with each of the plurality of first protrusions, wherein, when the distance is the first distance, the first protruding part is positioned inside of a groove of the plurality of first grooves, and the second protruding part is positioned outside of the plurality of second grooves by being in contact with a protrusion of the plurality of second protrusions, and wherein, when the distance is the second distance, the first protruding part is positioned outside of the plurality of first grooves by being in contact with a protrusion of the plurality of first protrusions, and the second protruding part is positioned inside of a groove of the plurality of second grooves.

18. The wearable device of claim 17, wherein the second protruding part is aligned with the first protruding part.

19. The wearable device of claim 16, wherein, when the distance is the second distance, the opening is compressed by a contact between the first protruding part and the groove of the plurality of grooves.

20. The wearable device of claim 16, wherein the plurality of grooves is arranged to be spaced apart from each other along a movement direction of the first lens support with respect to the second lens support.

* * * * *